(12) United States Patent
Tada et al.

(10) Patent No.: US 6,271,869 B1
(45) Date of Patent: Aug. 7, 2001

(54) MULTICOLOR IMAGE FORMING APPARATUS HAVING ADJUSTABLE OPTICAL MEMBERS

(75) Inventors: Naoyuki Tada, Ebina; Yoshiaki Haginoya, Iwatsuki, both of (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/455,456

(22) Filed: Dec. 6, 1999

(30) Foreign Application Priority Data

Dec. 15, 1998 (JP) .................................................. 10-356119
Dec. 18, 1998 (JP) .................................................. 10-361204

(51) Int. Cl.[7] ............................ B41J 2/385; G01D 15/06; G03G 15/01
(52) U.S. Cl. ........................................... 347/116; 347/233
(58) Field of Search ..................................... 347/115, 116, 347/129, 132, 133, 232, 233, 241, 242, 245; 399/301

(56) References Cited

U.S. PATENT DOCUMENTS 4,847,642 * 7/1989 Murayama et al. .
5,302,973 * 4/1994 Costanza et al. .
5,379,059 * 1/1995 Winsor .
5,543,829 * 8/1996 Fisli ........................................ 347/241
5,627,579 * 5/1997 Fisli .................................... 347/245 X

FOREIGN PATENT DOCUMENTS 59-7331    1/1984  (JP) .
3-142412   6/1991  (JP) .
3-150521   6/1991  (JP) .

* cited by examiner

Primary Examiner—Sandra Brase
(74) Attorney, Agent, or Firm—Oliff & Berridge, PLC

(57) ABSTRACT

Disclosed a multicolor image forming apparatus that facilitates correction operations to correct skews of a plurality of images. Turing a dial of an adjusting apparatus tilts a cylindrical mirror and thereby changes an irradiation position of a light beam to be irradiated onto a photoreceptor. Since the rotation of the dial and the movement of the cylindrical mirror correspond, an operator can know the state of the cylindrical mirror by visually checking a mark of the dial and a scale plate. When a color skew of images occurs, the operator can perform easily adjustment operations by the adjusting apparatus while checking a color skew amount and the state of a corresponding cylindrical mirror by the mark and the scale plate.

11 Claims, 26 Drawing Sheets

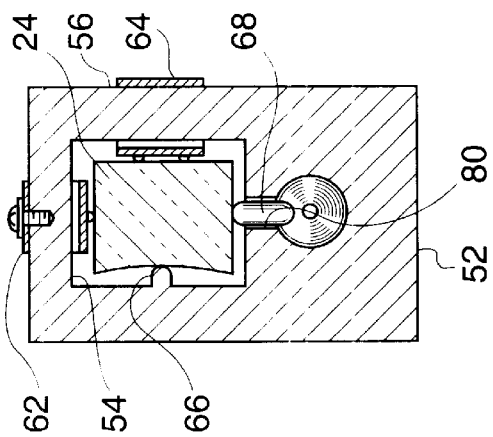
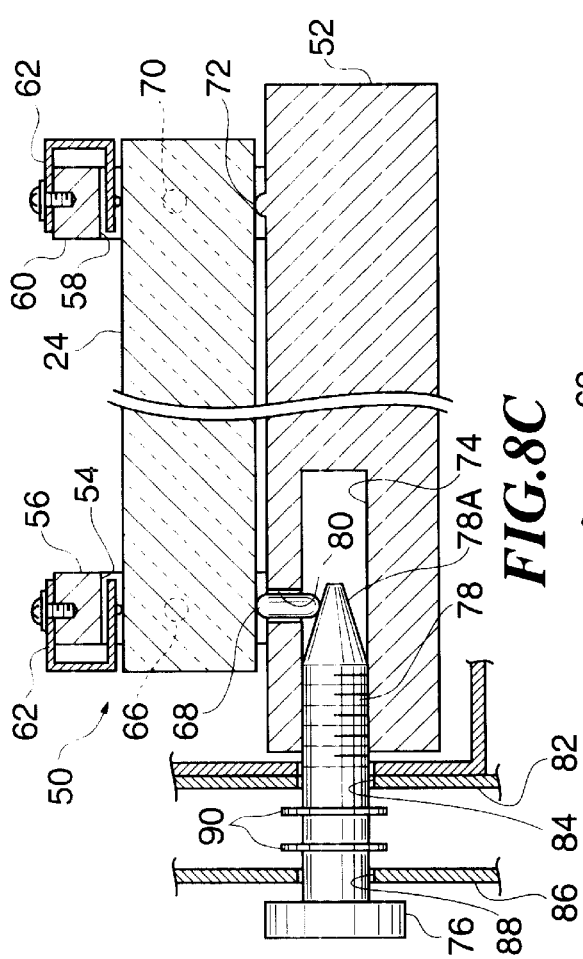
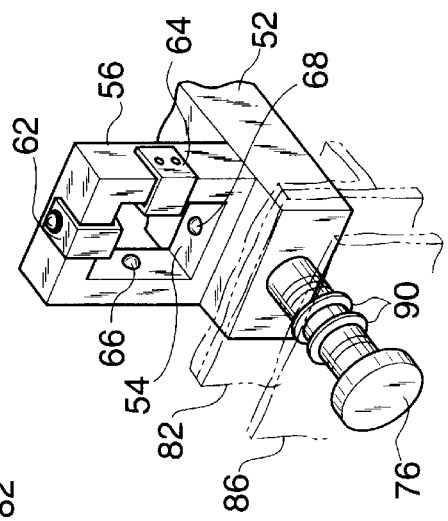

MULTICOLOR IMAGE FORMING APPARATUS HAVING ADJUSTABLE OPTICAL MEMBERS

BACKGROUND OF THE INVENTION

1. Field of the Invention

The present invention relates to a multicolor image forming apparatus, and more particularly to a multicolor image forming apparatus such as a color laser printer and a color digital copying machine of a multi-photoreceptor system that obtains an image by scanning light beams onto a plurality of photoreceptors.

2. Description of the Related Art

As a conventional image forming apparatus of a multi-photoreceptor system, the one having a structure as shown in FIG. 23 is proposed (see Japanese Published Unexamined Patent Application No. Hei 3-142412).

In such an image forming apparatus, generally, laser beams emitted from four laser light sources corresponding to cyan (C), magenta (M), yellow (Y), and black (K) are bidirectionally scanned by a polygon mirror 201 mounted in a light deflector. Thereafter, the laser beams pass through a scanning imaging optical system, are reflected in mirrors 202 to 213, and scan on the photoreceptors 214 to 217 corresponding to the colors. Latent images formed on the photoreceptors are developed by a developing apparatus and successively transferred onto paper transported by a transporting belt 218 to form a color image.

Another conventional image forming apparatus will be described with reference to FIGS. 25 to 27. In these drawings, the reference numeral 250 designates an exposing apparatus; 252K, 252Y, 252M, and 252C, laser beams; 254, a deflector; 256K, 256Y, 256M, and 256C, mirror assemblies; 258K, 258Y, 258M, and 258C, photoreceptors; 260A and 260B, registermarks; and 262A and 262B, detecting parts. In the exposing apparatus 250, the four laser beams are scanned, by one deflector 254, on the photoreceptors 258K, 258Y, 258M, and 258C corresponding to black (K), yellow (Y), magenta (M), and cyan (C), a transfer material (paper) not shown is transported by a belt 264, and multiple images are transferred from the photoreceptors onto the transfer material, whereby a color image is formed. The exposing apparatus 250 scans and deflects, by the deflector 254, laserbeams 252K, 252Y, 252M, and 252C containing information, emitted from light sources (not show), which are irradiated straightly onto the materials 258K, 258Y, 258M, and 258C to be scanned after passing through imaging lens systems (not shown) and mirror assemblies 256K, 256Y, 256M, and 256C into which reflecting mirrors are built. SOS (Start of Scan) is used to determine a write timing of the laser beams 252K, 252Y, 252M, and 252C, which are scanned and irradiated onto the photoreceptors 258K, 258Y, 258M, and 258C with a given delay after passing through a pickup mirror 266 and being detected by synchronous light detecting apparatuses 268K, 268Y, 268M, and 268C. To correct a skew of each color, the gradient of a scanning line (hereinafter referred to as a skew) is adjusted in this case. For example, the mirror assemblies 256K, 256Y, 256M, and 256C are provided at one end with a rotation center 270 and at the other with an actuator 272, register marks 260A and 260B are formed on the belt 264 and are detected by the detecting parts 262A and 262B to detect skews of scanning lines, and based on the result, the actuator 272 is driven up and down in the E direction around the rotation center 270, whereby skew adjustments are performed to form a color image free from color skews. Since the rotation center 270 is provided around an axis intersecting a light path of the above described SOS light, such a configuration prevents the SOS light from deviating from the synchronous light detecting apparatuses 268K, 268Y, 268M, and 268C due to the rotation of the mirror assemblies 256K, 256Y, 256M, and 256C during skew adjustments. Such an exposing apparatus 250 is disclosed in, e.g., Japanese Published Unexamined Patent Application No. Hei 3-150521.

Further, the configuration of another conventional exposing apparatus 450 will be described with reference to FIGS. 28 to 30. In the exposing apparatus 450, a laser beam 454 is emitted from a light source 452, passes through a light-gathering lens not assigned a reference numeral, is deflected by a deflector 456, passes through an imaging lens system 458, is reflected by a reflecting mirror 462 of a mirror assembly 460, and is irradiated onto a photoreceptor 464. The mirror assembly 460 is provided with a rotation center 466 in an upper portion near the central portion of scanning, and an adjusting part 468 and a spring 470 are provided at one end of the mirror assembly. In such a configuration, since the mirror assembly 460 rotates around the upper portion near the central portion of scanning during skew adjustments by moving the adjusting unit along the direction of the arrow D, skews can be adjusted. Such a mirror assembly configuration of an exposing apparatus is disclosed in, e.g., Japanese Published Unexamined Patent Application No. Sho 59-7331.

A disclosed method of correcting axis skews of photoreceptors due to a mounting error occurring when the photoreceptors 214 to 217 are mounted in such an image forming apparatus has problems of the complicated mechanism and high cost. In this method, a register mark 219 transferred onto a transporting belt 218 is sensed by a sensor such as CCD220, and mirrors 202 and 203 as shown in FIG. 24 are moved by actuators 223 to 225. Also, as technology to simplify mechanism, a method is proposed which corrects axis skews of photoreceptors by operating optical parts within an exposing apparatus from the outside. However, in an exposing apparatus that scans scanning beams on both photoreceptors and a polygon mirror, as shown in FIG. 23, since the directions of scanning lines 226 to 229 scanned in both of them are opposite such as the direction of the arrow A (scanning lines 226 and 227) and the direction of the arrow B (scanning lines 228 and 229), adjusting parts are placed separately in the front and rear parts of an image forming apparatus, posing a problem that a large number of man-hours are needed for adjustment operations. Also, for safety purposes and from a configuration viewpoint, adjustment results are not obtained until an image forming apparatus has been assembled, requiring repetitive operations such as many disassembling and assembling operations and confirmation of image color skew amounts.

Furthermore, since the exposing apparatus 250 shown in FIGS. 25 and 26 is constructed to scan four laser beams by one deflector 254, as shown in FIG. 27, the synchronous light detecting apparatuses 268K, 268Y, 268M, and 268C are placed in a staggered manner across the deflector 254. In this example, a maintenance space need not be considered so seriously because the actuator 272 is small and skew adjustments are automatically performed. However, in order to reduce costs, if the actuator 272 is displaced so as to manually move relevant parts and skew dials 274K, 274Y, 276M, and 274C are provided as shown in FIG. 27, since a maintenance space (a space in which to manually move the dials) must be provided, there arises a problem that the size of a multicolor image forming apparatus increases by twice S.

A mirror assembly 460 of further another conventional exposing apparatus 450 as shown in FIGS. 28 and 29 has a problem that, if skew adjustments are performed as shown in FIG. 30, a laser beam 454C passing on the rotation center 466 is unchanged in light path length, but a laser beam 454E passing through a scanning end portion changes by X' in light path length, from X+Y to X+X'+Y.

SUMMARY OF THE INVENTION

In view of the above described facts, present invention provides a compact multicolor image forming apparatus that eases operations to correct skews of a plurality of images and provides an easy way to perform optical adjustments.

The present invention also provides a multicolor image forming apparatus that obtains one multicolor image by overlapping images of a plurality of different colors formed on a plurality of photoreceptors by a plurality of light beams, the multicolor image forming apparatus comprising: optical members provided for each of the plurality of light beams; and correction units, provided corresponding to each of the optical members, capable of moving the optical members to move irradiation positions of the light beams to be irradiated onto the photoreceptors, wherein the correction units can be adjusted by setting units that obtain a movement amount of the optical members, corresponding to an operation amount by predetermined operations.

In the multicolor image forming apparatus, irradiation positions of light beams to be irradiated onto photoreceptors can be changed by the correction units. Therefore, if irradiation positions of light beams are changed by the correction units so that an image formed on one photoreceptor matches an image formed on another photoreceptor, a multicolor image free from color skews is obtained. By operating the setting units, the optical members can be moved by an amount corresponding to the amount of operation of the setting units. At this time, the setting units may be formed integrally with the correction units, or may be provided separately from the correction units and inserted into the setting units (dial, screwdriver, Allen key, etc.) when adjustments are necessary.

The multicolor image forming apparatus further comprising an indication units that indicate the state of the correction units.

In this case, the state of the correction units can be indicated by the indication units, and an operator can indirectly know the state of the correction units by visually checking the indication units. Since the correction units, the setting units, and the optical members interrelate with one another, the states of the setting units and the optical members can also be obtained by the indication units. Accordingly, when a color skew of an image occurs and an operator adjusts the color skew using the correction units as described above, the operator can easily adjust a correction amount (a movement amount of the optical members) of the correction units corresponding to the color skew amount by the setting units while checking the state of the correction units indicated by the indication units. Hence, complicated adjustment control mechanisms need not be used to correct color skews. In this case, it goes without saying that the indication units may be provided in a unit (exposing apparatus) comprising the correction units and light sources to emit light beams, or in other components, such as frames of an image forming apparatus.

The operation direction of the setting units and the movement direction of irradiation positions of the light beams preferably correspond with each other, in other words, those directions are consistent with each other.

In this case, when an operator operates the setting units by visually checking an image skew amount, the operator has to operate adjustment units in line with a direction corresponding to the direction of an image skew and is freed from an operation mistake such as performing operations in a direction that mistakenly expands the skew, so that the image skew can be easily corrected. Therefore, this is particularly effective when an optical system is designed so that, even if optical members are moved in an identical direction, beam reflection directions move in opposite directions among the optical members.

The plurality of setting units may be disposed in a predetermined direction.

Generally, a color skew adjustment mechanism and the like are provided inside an exterior cover to avoid adjustment errors due to the user's careless contact. Accordingly, when performing color skew adjustments, a manufacturer's operator must remove the exterior cover, and to determine if a color skew becomes a proper value, cannot create a skew amount confirmation image (print sample) without attaching the removed exterior cover to shade the inside. Therefore, if a plurality of setting units are provided in a predetermined direction of the image forming apparatus as in the present invention, the number of an exterior cover and other parts that must be removed for adjustment operations can be reduced, so that needless operations are eliminated and adjustments can be performed in a short time. A plurality of indication units are also preferably provided in a predetermined direction.

A space to adjust the correction units by the setting units may be isolated from at least one of a mechanically driven part or a heating part and provided in a place shielded against the light beams.

In this case, a space (a space necessary for an operator to operate (a space to put hands in) the setting units) to adjust the plurality of correction units by the setting units is isolated from a mechanically driven part, a heating part and the like and provided in a place shielded from laser beams (light beams) emitted from an exposing apparatus. Therefore, by opening a cover that can be easily opened and closed by means of hinges or the like, and need not be removed, the correction units can be adjusted even if the image forming apparatus is ready for operation or is operating. This eliminates not only operations to disassemble and assemble the exterior cover but also a wait time for restoration of a fixing device cooled because of cover removal/attachment operations, a wait time for an exposing apparatus to become stable, and a wait time, in a multicolor image forming apparatus, for electrically correcting an image color skew amount at general power on, so that needless operations are eliminated and adjustments can be performed in a short time. The above-described cover may not be provided in a place resistant to operators' careless operations or may be fixed if the image forming apparatus is operated by only maintenance operators.

A movement amount of an irradiation position of the light beams for an operation amount of the setting units may be identical in all setting units.

In this case, since the operator's adjustment sensitivity will be the same for all colors, adjustment operations can be easily performed.

The indication units may comprise a first indication unit that indicates a first state of the correction units and a second indication unit that indicates a second state of the correction units.

In this case, for example, when optical members, correction units, setting units, indication units and the like can be loaded into and unloaded from, as a unit, a main portion of a multicolor image forming apparatus including a plurality of photoreceptors, the state of the correction units when light beams are adjusted on a unit basis can be indicated by a first indication unit as a first state, and the state of the correction units after final adjustments in a state in which the adjusted unit is mounted in the main portion of the image forming apparatus can be indicated by a second indication unit as a second state.

In this way, since the state of completion of unit assembling adjustments and the state of completion of adjustments after the unit has been mounted in the main portion of the multicolor image forming apparatus can be indicated, for example, if a unit portion fails in the market and is to be replaced, by confirming the state of the correction units of the failed unit by indication units and performing operations so that the state of the correction units of a new unit for replacement matches the state of the failed unit, preparatory adjustments can be performed before unit replacement, that is, before obtaining an image for color skew confirmation, so that subsequent adjustment operations (final adjustments) are minimized (in some cases, final adjustments are unnecessary), and therefore operations are simplified. The second indication unit, which indicates the state of corrections after the unit is mounted in the main portion of the image forming apparatus, may not be a unit (an exposing apparatus), but may be provided in part of the image forming apparatus, e.g., a structure part of the image forming apparatus.

The setting units are exposed, in other words, the setting units are separately positioned in the apparatus from an area defined by an exposing unit comprising at least light sources, imaging lens systems, and a deflector including a polygon mirror.

In this case, the cover of the exposing apparatus need not be removed. Furthermore, the setting units may be exposed from the image forming apparatus, facilitating corrections of the optical members.

The correction units may be skew correction units capable of rotating the plurality of optical members with one end thereof in a main scanning direction as a fulcrum and all of them are provided on the same side. Therefore, skews of scanning lines can be corrected by rotating a reflecting mirror with one end thereof in a main scanning direction as a fulcrum by the skew adjustment units. Since the skew correction units are placed on the same side, a maintenance space may be provided only at the skew correction units, that is, one side of an exposing apparatus, contributing to miniaturization of a multicolor image forming apparatus provided with the exposing apparatus.

The exposing unit may includes at least one of detecting units that detect skews of light beams in a sub scanning direction, reflected by the optical members corrected by the skew correction units, and the fulcrum of the skew correcting units is provided on the detecting unit side. Therefore, skews of light beams in a sub scanning direction within an exposing apparatus can be detected within the exposing apparatus. Information of skews of light beams in a sub scanning direction, detected by the detecting unit, is used to operate a write timing of the light beams, and thereby skews in the sub scanning direction can be corrected. For example, information obtained by a detecting unit is inputted to a control apparatus to control light sources, and an emission timing of light beams from the light sources is hastened or delayed by one scanning line or plural scanning lines, whereby skews in the sub scanning direction can be corrected. Since the detecting units are provided on the fulcrum side of the skew adjustment units, even if a reflecting mirror is tilted a little for skew adjustments, there is little movement on the fulcrum side of the skew adjustment units. Accordingly, even if skew adjustments are performed, light beams reflected on the fulcrum side of the reflecting mirror and incident on the detecting unit do not move, exerting no influence on detection of skews of light beams in the sub scanning direction.

Reflecting mirrors may be cylindrical mirrors and a movement direction of the cylindrical mirrors during adjustments may be a reflecting interface direction, skews can be adjusted without causing a change of a light path and a scaling factor.

BRIEF DESCRIPTION OF THE DRAWINGS

Preferred embodiments of a multicolor image forming apparatus according to the present invention will be described in detail based on the drawings:

FIG. 8A is a cross-sectional view of an adjusting apparatus in a longitudinal direction of a cylindrical mirror, FIG. 8B, a cross-sectional view of a first holding part in a direction orthogonal to the longitudinal direction of the cylindrical mirror, and FIG. 8C, a perspective view of a dial in the vicinity of a mounting position;

DESCRIPTION OF THE PREFERRED EMBODIMENTS

[First Embodiment]

Figure 2:
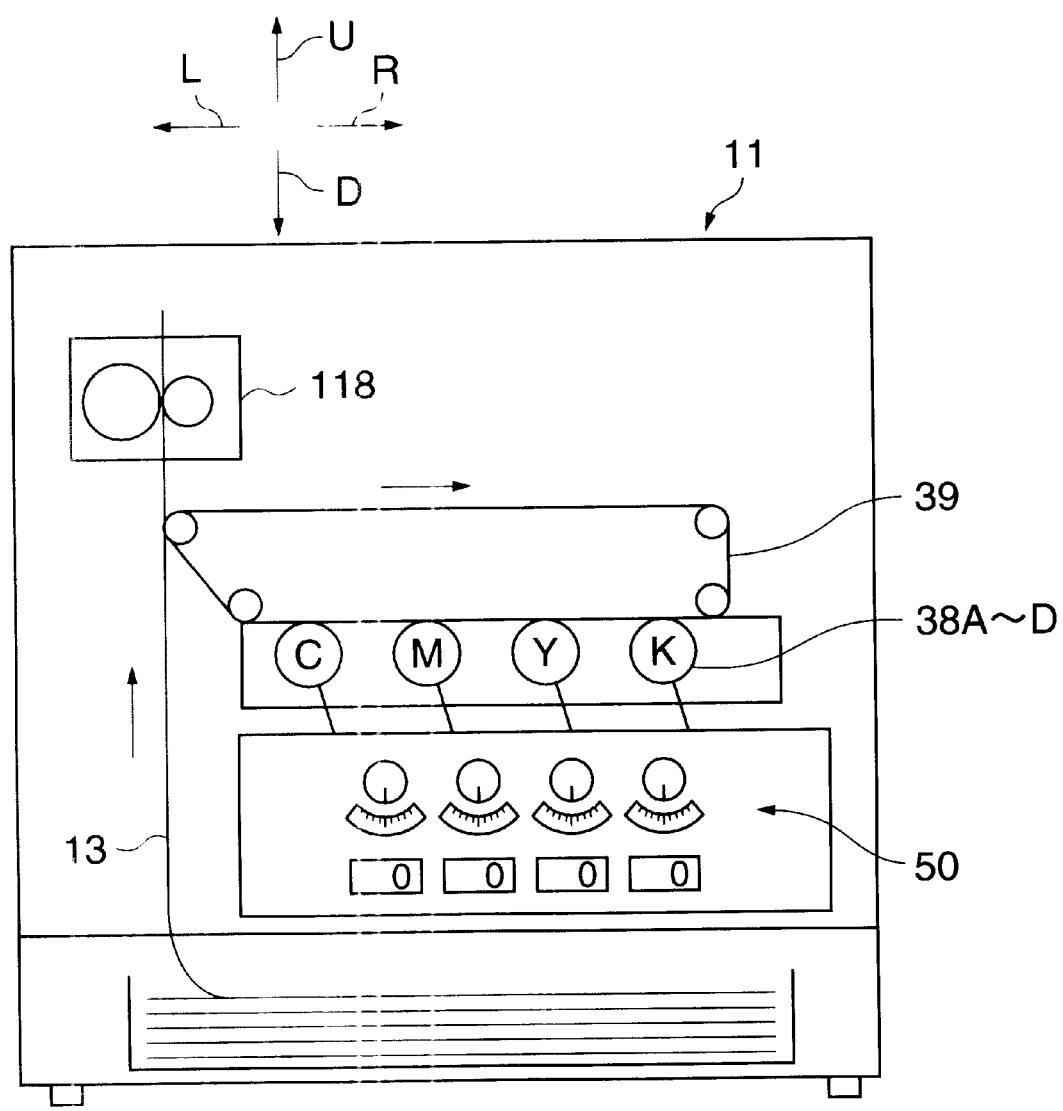
FIG. 2 is a front cross-sectional view showing a schematic configuration of the multicolor image forming apparatus of the first embodiment of the present invention.
Figure 3:
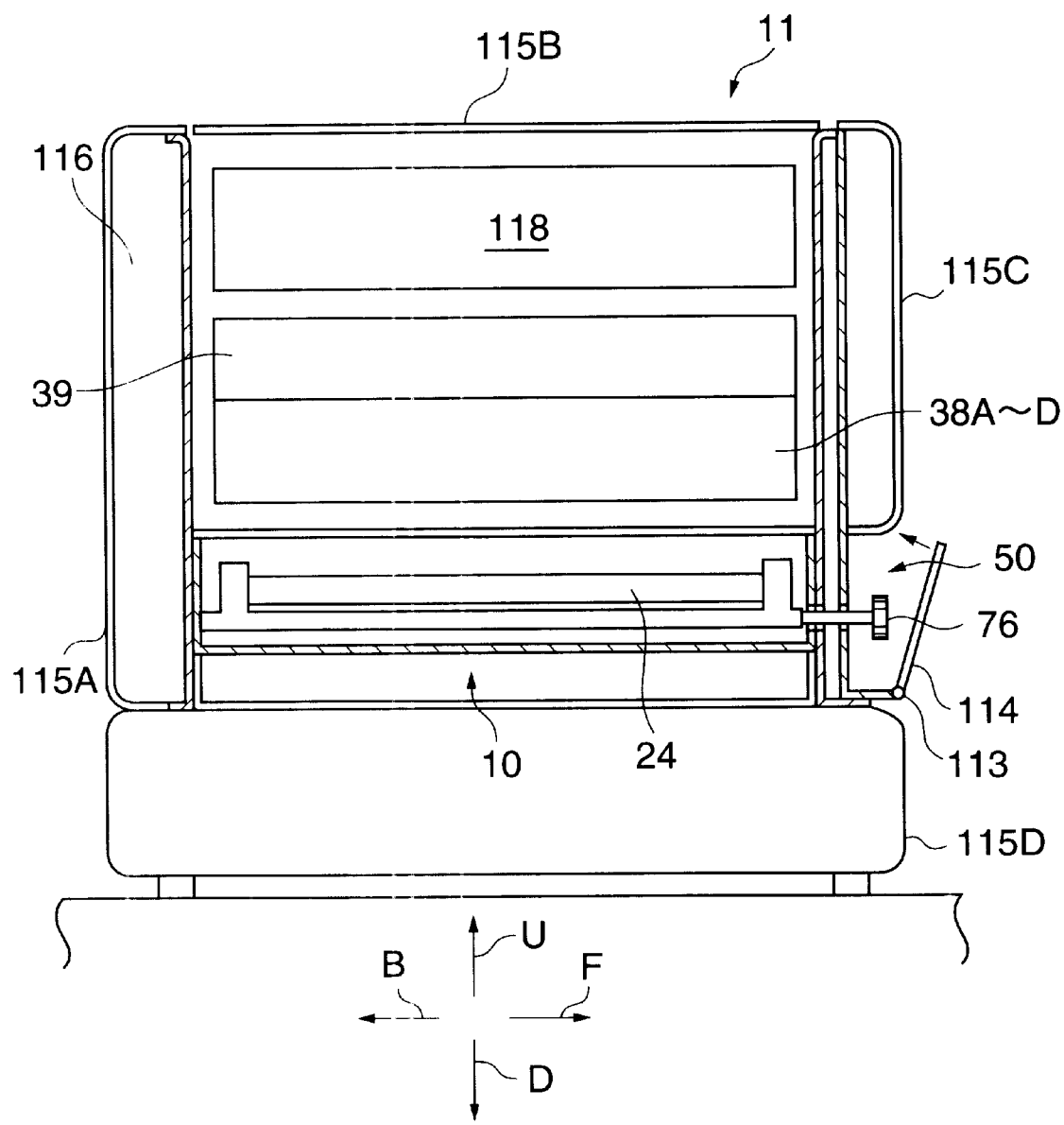
FIG. 3 is a cross-sectional side view showing a schematic configuration of the multicolor image forming apparatus of the first embodiment of the present invention.
Figure 4:
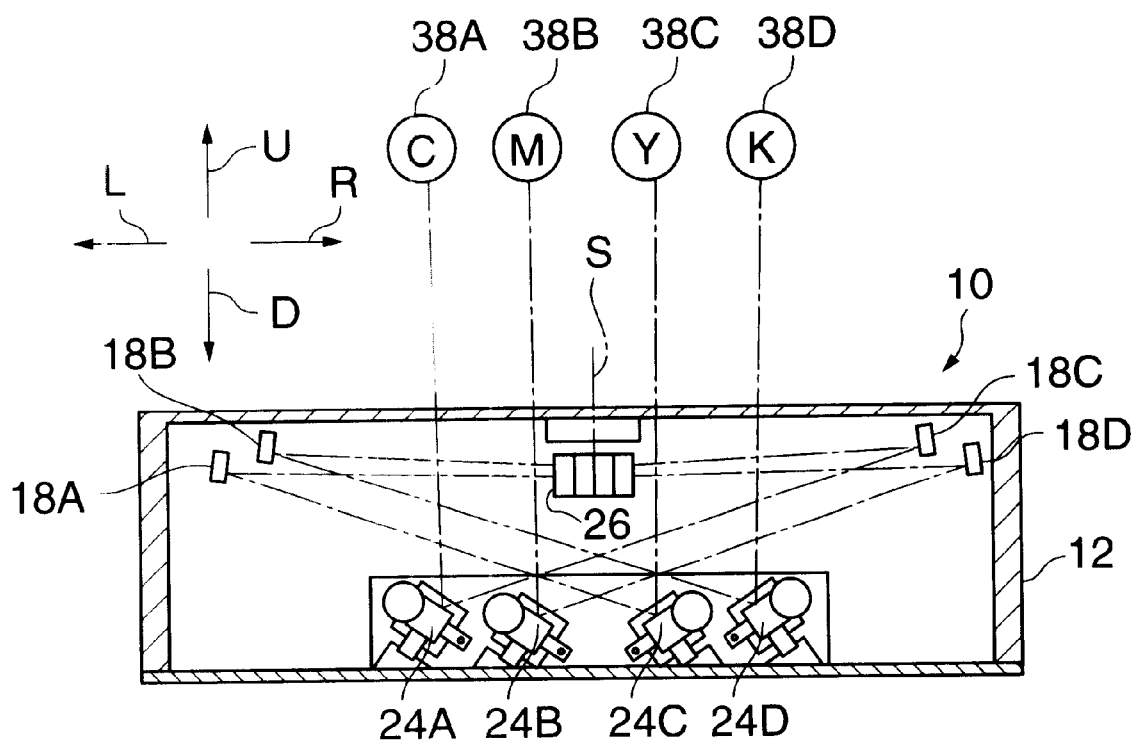
FIG. 4 is a cross-sectional view showing an exposing apparatus and photoreceptors of the multicolor image forming apparatus of the first embodiment of the present invention.
Figure 5:
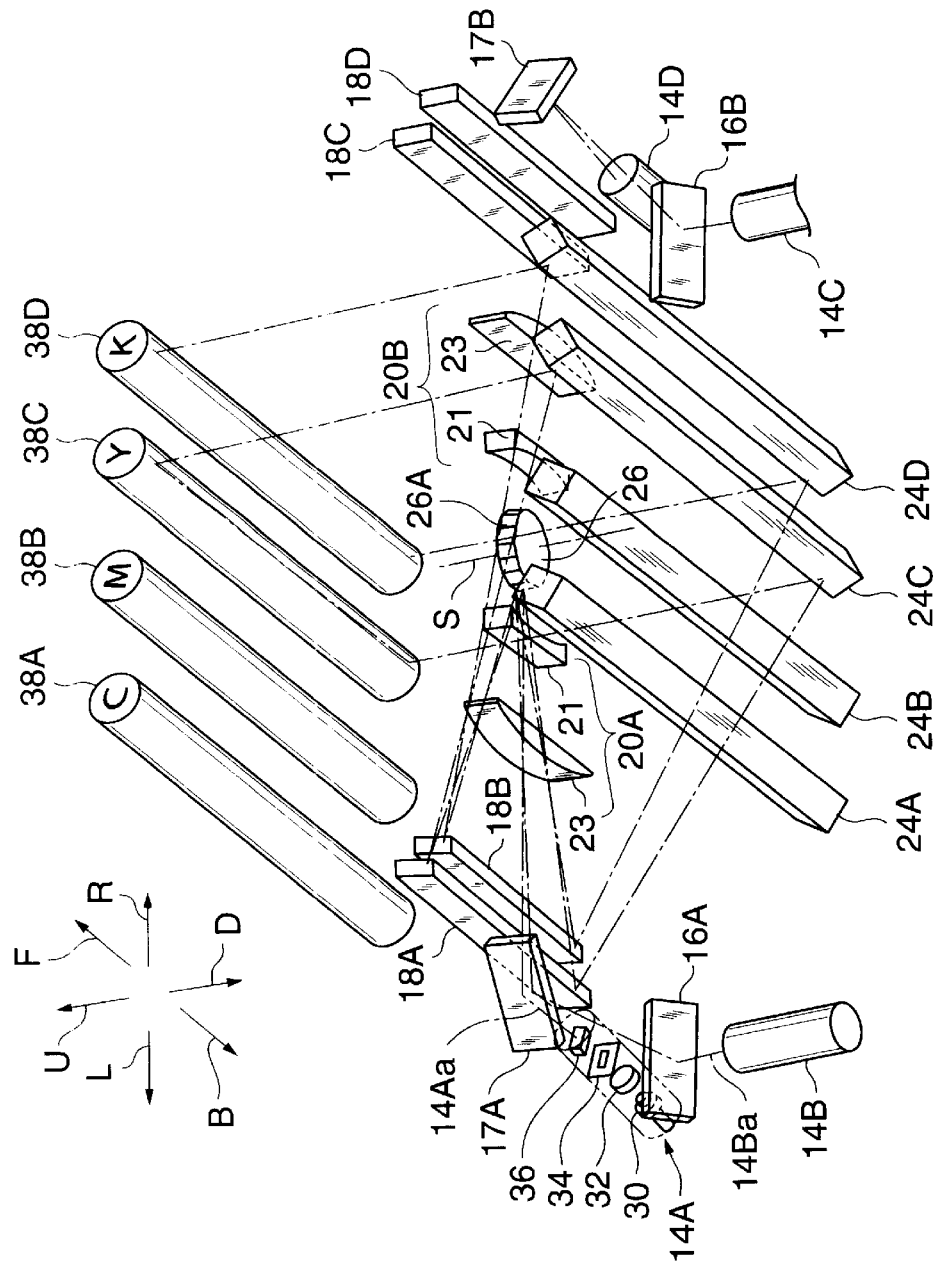
FIG. 5 is a perspective view showing the optical system of the exposing apparatus of the multicolor image forming apparatus of the first embodiment of the present invention.

A first embodiment of an image forming apparatus of the present invention will be described with reference to the accompanying drawings. As shown in FIGS. 2 and 3, a multicolor image forming apparatus 11 of the embodiment includes an exposing apparatus (optical scanner) 10. As shown in FIGS. 4 and 5, the exposing apparatus 10 comprises an optical box 12, light sources 14A, 14B, 14C, and 14D, plane mirrors 16A and 16B, plane mirrors 17A and 17B, plane mirrors 18A, 18B, 18C, and 18D, fθ lens systems 20A and 20B, a polygon mirror 26, cylindrical mirrors 24A, 24B, 24C, and 24D, and the like. The fθ lens systems 20A and 20B each comprise fθ lenses 21 to 23. As shown in FIGS. 2 to 4, above the plurality of exposing apparatuses 10 (the direction of the arrow U), the following components of the multicolor image forming apparatus 11 are placed in a horizontal direction (the direction of the arrows L and R): a photoreceptor 38A for cyan (C), a photoreceptor 38B for magenta (M), a photoreceptor 38C for yellow (Y), and a photoreceptor 38D for black (K). As shown in FIGS. 4 and 5, the polygon mirror 26 is rotated by a motor not shown. The polygon mirror 26 is placed at the center of the optical box 12 so that the rotary axis S thereof extends in a vertical direction (the direction of the arrows U and D), the fθ lens system 20A, the plane mirrors 18A and 18B, and the plane mirror 17A are placed in the direction, indicated by the arrow L, of the polygon mirror 26, and the fθ lens system 20B, the plane mirrors 18C and 18D, and the plane mirror 17B are placed in the direction, indicated by the arrow R, of the polygon mirror 26. The cylindrical mirrors 24A and 24B are placed in the direction, indicated by the arrow D, of the fθ lens system 20A, and the cylindrical mirrors 24C and 24D are placed in the direction, indicated by the arrow D, of the fθ lens system 20B. The light source 14A is placed in the direction, indicated by the arrow B, of the plane mirror 17A, and the plane mirror 16A and the light source 14B are placed in the direction, indicated by the arrow, of the light source 14A. Similarly, the light source 14D is placed in the direction, indicated by the arrow B, of the plane mirror 17B, and the plane mirror 16B and the light source 14C are placed in the direction, indicated by the arrow B, of the light source 14D. The light sources 14A to 14D each include a semiconductor laser 30 to emit a light beam, a collimator lens 32 to transform an incident light beam into a collimated beam, a slit 34 to shape a beam width, and a cylindrical lens 36 to transform a light beam into a beam diverging in directions corresponding to a main scanning direction and a sub scanning direction. The light sources 14A to 14D irradiate a light beam which is diffused light having a greater divergence angle in a direction corresponding to a main scanning direction than that in a direction corresponding to a sub scanning direction. The semiconductor laser 30 is placed inside a focal point position of the collimator lens 32 and a light beam emitted from the semiconductor laser 30 is transformed into loosely diverging light in directions corresponding to the main scanning direction and the sub scanning direction by the collimator lens 32. The light beam transformed into the loosely diverging light is limited in the beam width of a direction corresponding to the sub scanning direction by the slit 34 (since this embodiment is an overfilled optical system, the beam width of a direction corresponding to the main scanning direction is limited by the surface width (surface width of a direction orthogonal to the axial direction) of a deflection side 26A of the polygon mirror 26). The light beam passing through the slit 34 is transformed into converging light to converge only in a direction corresponding to the sub scanning direction by the cylindrical lens 36. Two light beams from each end, that is, light beams 14A$a$ and 14B$a$ from the left and light beams 14C$a$ and 14D$a$ from the right are incident on the polygon mirror 26.

Next, the light beams 14A$a$ and 14B$a$ will be described.

The light beam 14A$a$ emitted from the light source 14A and the light beam 14B$a$ emitted from the light source 14B pass through the fθ lens system 20A having power only in the direction corresponding to the main scanning direction and enters the deflection surface 26A of the polygon mirror 26. The light beams 14A$a$ and 14B$a$ incident on the deflection surface 26A converge in the vicinity of the surface of the deflection surface 26A in the direction corresponding to the sub scanning direction. At this time, since the surface width of each deflection surface 26A is smaller than the width of the light beams 14A$a$ and 14B$a$ in a direction corresponding to the main scanning direction, these light beams 14A$a$ and 14B$a$ form slim line images extending onto a plurality of deflection surfaces 26A on the surface of the polygon mirror 26. Only parts of the light beams 14A$a$ and 14B$a$ irradiated on one facet of the deflection surface 26A, of the line images long in the main scanning direction, are reflected and deflected and are incident on the fθ lens system 20A again (a so-called over-filled optical system is formed). The light beam 14Aa passing through the fθ lens system 20A is reflected slantingly in the direction, indicated by the arrow L, of the deflector 22 by the plane mirror 18A, and then reaches the cylindrical mirror 24C, and is reflected toward the photoreceptor 38C in the direction of the arrow U by the cylindrical mirror 24C. The light beam 14Aa incident on the fθ lens system 20A is focused in the vicinity of the surface of the photoreceptor 38C in the main scanning direction by power in the direction corresponding to the main scanning direction of the fθ lens system 20A.

On the other hand, the light beam 14Ba passing through the fθ lens system 20A is reflected slantingly in the direction, indicated by the arrow D, of the deflector 22 by the plane mirror 18B, and then reaches the cylindrical mirror 24D, and is reflected in a horizontal direction toward the photoreceptor 38D in the direction of the arrow U by the cylindrical mirror 24D. The light beam 14Ba incident on the fθ lens system 20A is focused in the vicinity of the surface of the photoreceptor 38D in the main scanning direction by power in the direction corresponding to the main scanning direction of the fθ lens system 20A. At this time, the light beam 14Aa is converged in the vicinity of the surface of the photoreceptor 38C in the sub scanning direction by the cylindrical lens 36 and the cylindrical mirror 24C, and in the main scanning direction by the fθ lens system 20A, is irradiated as a spot of a predetermined diameter on the surface of the photoreceptor 38C, and is scanned at an almost constant speed in the main scanning direction on the surface of the photoreceptor 38C by the fθ lens system 20A. Similarly, the light beam 14Ba is converged in the vicinity of the surface of the photoreceptor 38D in the sub scanning direction by the cylindrical lens 36 and the cylindrical mirror 24D, and in the main scanning direction by the fθ lens system 20A, is irradiated as a spot of a predetermined diameter on the surface of the photoreceptor 38D, and is scanned at an almost constant speed in the main scanning direction on the surface of the photoreceptor 38D by the fθ lens system 20A. The cylindrical mirror 24D has power only in the direction corresponding to the sub scanning direction and acts to reduce a positional shift in the sub scanning direction of a spot on the surface of the photoreceptor 38D due to a tilt of each deflection surface 26A of the polygon mirror 26. Similarly, the cylindrical mirror 24C has power only in the direction corresponding to the sub scanning direction and acts to reduce a positional shift in the sub scanning direction of a spot on the surface of the photoreceptor 38C due to a tilt of each deflection surface 26A of the polygon mirror 26. Furthermore, in the optical system of this embodiment, the two light beams 14Aa and 14Ba incident on one side (herein, the left side) of the polygon mirror 26 are different from each other in incident angle and incidence point in the direction corresponding to the sub scanning direction.

Figure 6:
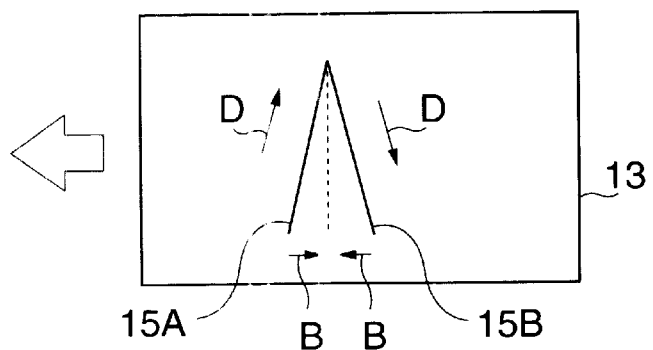
FIG. 6 is a plane view of paper on which a color-skewed image is recorded.

The light sources 14C and 14D, the plane mirrors 16B, 18C, and 18D, the fθ lens system 20B, and the cylindrical mirrors 24A and 24B are placed symmetrically with the previously described light sources 14A and 14B, plane mirrors 16A, 18A, and 18B, fθ lens system 20A, and cylindrical mirrors 24C and 24D with respect to the rotary axis of the deflector 22. For this reason, a description of the light beam 14Ca emitted from the light source 14C and the light beam 14Ca emitted from the light source 14D is omitted. The light beam 14Ca emitted from the light source 14C enters the photoreceptor 38A and the light beam 14Da emitted from the light source 14D enters the photoreceptor 38B. As shown in FIG. 2, the photoreceptors 38A to 38D each include an electrifying apparatus (not shown) for electrifying the photoreceptor surface, and a latent image is formed by a light beam being irradiated on the electrified photoreceptor surface. The latent image is developed into a toner image by a developing apparatus (not shown) and the toner image is transferred on a transfer belt 39 driven by the driving force of a motor not shown. The photoreceptor 38A is provided with a developing apparatus having black toner, the photoreceptor 38B is provided with a developing apparatus having yellow toner, the photoreceptor 38M is provided with a developing apparatus having magenta toner, and the photoreceptor 38C is provided with a developing apparatus having cyan toner. A black toner image, a yellow toner image, a magenta toner image, and a cyan toner image are successively transferred onto the transfer belt 39, and the toner images on the transfer belt 39 are transferred on paper 13 and are fixed by a fixing unit 118. The fixing unit 118 of this embodiment includes a heater not shown and the toner images are fixed (heated fixing) by heating the paper 13. If an axis shift occurs in the photoreceptor 38 (in this embodiment, the axis tilts within the horizontal surface), even if the directions of the light beams 14Aa, 14Ba, 14Ca, and 14Da are identical, the light beam scanning directions (the main scanning directions) with respect to the axes of the photoreceptors 38A, 38B, 38C, and 38D will be different from one another. Therefore, forexample, as shown in FIG. 6, a toner image 15A formed by the light beam 14Aa on paper 13 and a toner image 15B formed by the light beam 14Da deviate in the sub scanning directions (the directions indicated by the arrows), causing so-called color skews.

Hereinafter, a method of correcting the color skews will be described.

Figure 7:
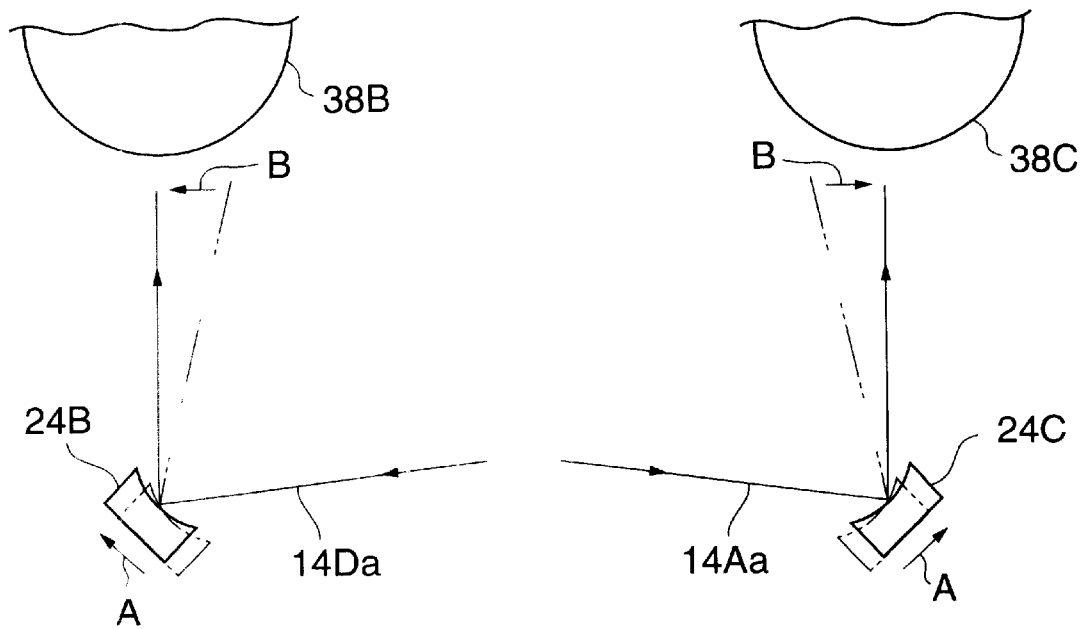
FIG. 7 is an illustration showing a change of light paths in accordance with movement of cylindrical mirrors.

As shown in FIG. 7, if the cylindrical mirror 24C to reflect the light beam 14Aa and the cylindrical mirror 24B to reflect the light beam 14Da are moved (namely, the mirrors are tilted), for example, in the direction of the arrow A at one end thereof in a longitudinal direction with another end as a fulcrum, reflected light beams 14Aa and 14Da can change from the position indicated by the two-dot chain line to the position indicated by the solid line, as shown by the arrow B. Thereby, as shown in FIG. 6, for example, the toner images 15A and 15B formed on paper 13 move as shown by the arrow B, so that they can be corrected from the deviated state as shown by the solid lines to the overlapped state as shown by the dotted line, namely, color skews can be corrected. At this time, as shown in FIG. 6, the scanning direction of the light beam 14Aa for forming the toner image 15A and the scanning direction of the light beam 14Da for forming the toner image 15B are opposite to each other as shown by the arrows D of FIG. 6. Namely, in the exposing apparatus 10 of this embodiment, the light beam scanning direction of the photoreceptors 38A and 38B and that of the photoreceptors 38C and 38D are opposite to each other. In this embodiment, a taper at the tip of a screw part 78 is used to move the cylindrical mirror 24. However, it goes without saying that an elevator or eccentric cam may be used to move the cylindrical mirror 24.

Next, a description will be made of a color skew adjusting apparatus mounted in the exposing apparatus 10. Referring to FIG. 8, an adjuster 50 for adjusting the tilt of the cylindrical mirror 24 will be described. As shown in FIGS. 8A to 8C, the adjuster 50 includes a holder 52 for holding the cylindrical mirror 24. The holder 52 is provided at one end with a first holding part 56 wherein the first holding part 56 has a rectangular hole 54 through which one end of the cylindrical mirror 24 is inserted, and is provided at another end with a second holding part 60 wherein the second holding part 60 has a rectangular hole 58 through which another end of the cylindrical mirror 24 is inserted. In each of the first holding part 56 and the second holding part 60, springs 62 and 64 are mounted, and the cylindrical mirror 24 is held in the first holding part 56 by being pushed against a projection 66 on the side of the rectangular hole 54 and an adjusting pin 68 projecting from the bottom, and in the second holding part 60 by being pushed against a projection 70 on the side of the rectangular hole 58 and an adjusting pin 72 on the bottom.

Figure 1A:
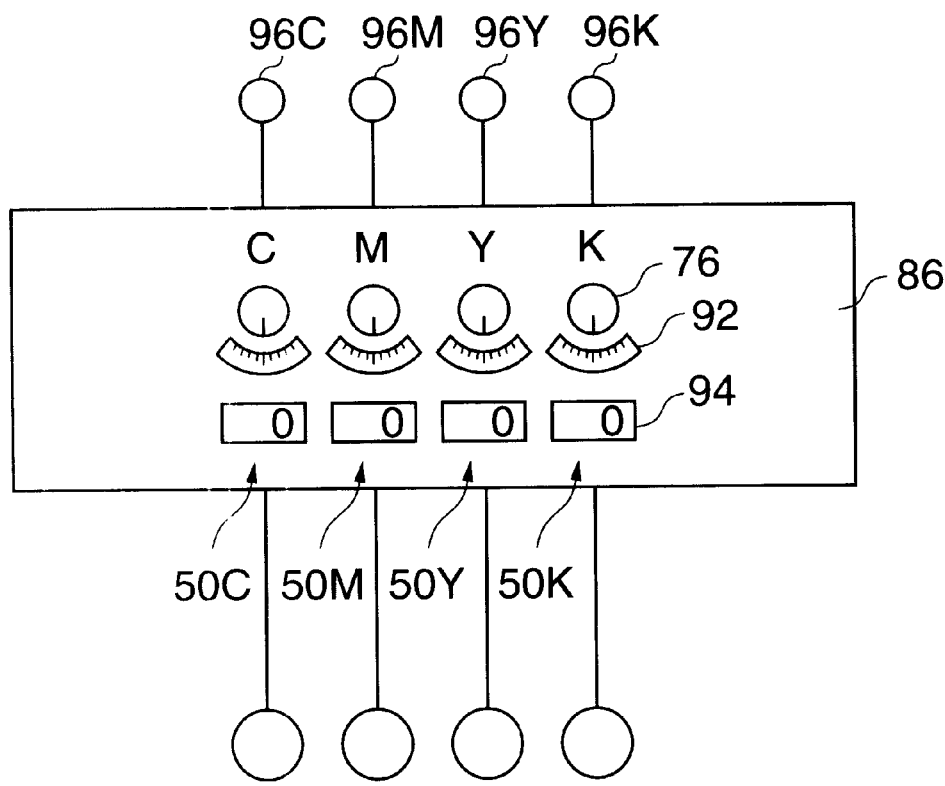
FIGS. 1A and 1B are front views of adjusting apparatuses of a multicolor image forming apparatus of a first embodiment of the present invention.
Figure 1B:
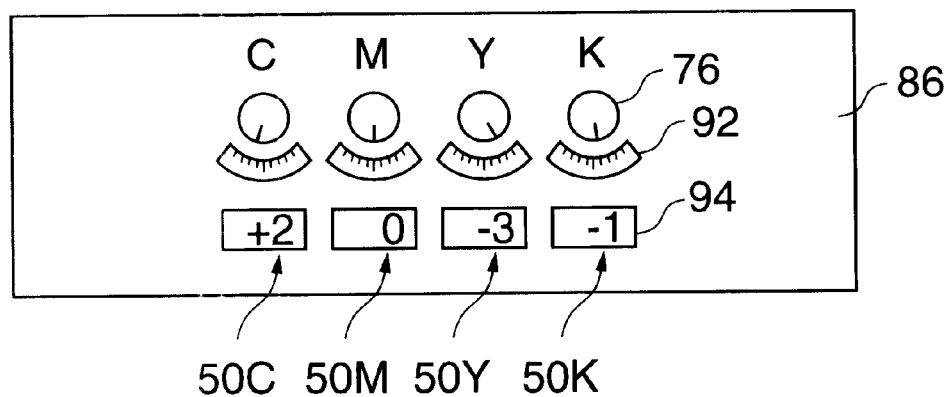

The holder 52 has a screw hole 74 formed at one end thereof and the screw part 78 provided integrally with a dial 76 is screwed in the screw hole 74. The tip of the screw part 78 is tapered and the end of the adjusting pin 68 energized by the spring 62 abuts the taper surface 78A. The adjusting pin 68 is movable along a hole 80 formed in the holder 52. The middle portion of the screw part 78 penetrates a hole 84 of a first panel 82 and a hole 88 of a second panel 86, and the dial 76 is disposed outside the second panel 86. The screw part 78 is provided, between the first panel 82 and the second panel 86, with two rings (E ring, etc.) 90 the outside diameter of which is larger than the inside diameter of holes 84 and 88. The exposing apparatus 10 includes an adjuster 50K for black, an adjuster 50C for cyan, an adjuster 50M for magenta, and an adjuster 50Y for yellow. As shown in FIG. 1, a scale plate 92, corresponding to each dial 76, is stuck to the outer surface of the second panel 86. A line-shaped mark 76A is provided on the dial 76 and a scale to indicate a rotation position of the dial 76 is printed on the scale plate 92. The second panel 86 is provided with a digital display device 94 below each scale plate 92. The digital display device 94 can digitally display a rotation position of the dial 76 just like the scale of the scale plate 92 can. In this embodiment, the scale plate 92 is used to store a state (correction amount) at completion of adjustments performed at completion of the assembly of the exposing apparatus 10 and the digital display device 94 is used to store a state (correction amount) at completion of adjustments performed after building the exposing apparatus 10 into the multicolor image forming apparatus 11. The screw part 78 of the dial 76 used in the adjuster 50Y for yellow has a right-hand thread, like the screw part 78 of the dial 76 used in the previously-described adjuster 50K for black. On the other hand, for magenta and cyan which are optically in a symmetrical relation with black and yellow, the screw part 78 of the dial 76 used in the adjuster 50M for magenta and the screw part 78 of the dial 76 used in the adjuster 50C for cyan have left-hand threads. For this reason, clockwise rotating the dial 76 having a right-hand thread causes the screw part 78 to move to the depth of the screw hole 74 and the adjusting pin 68 to move to the rectangular hole 54 as the taper surface 78A moves. Movement of the adjusting pin 68 tilts the cylindrical mirrors 24C and 24D abutting it. When the dials 76 for black and yellow are clockwise rotated, a tilt of the cylindrical mirrors 24C and 24D changes a beam emission direction, with the result that a toner image formed on paper 13 moves to the right. On the other hand, when the dials 76 for magenta and cyan are clockwise rotated, the cylindrical mirrors 24A and 24B tilt opposite in direction to the tilt of the cylindrical mirrors 24C and 24D. However, since the beam scanning directions are opposite to each other, the toner image formed on formed on paper 13 similarly moves to the right. Namely, the rotation direction of the dial 76 and the movement direction (the movement direction of scanning lines) of a toner image match among the colors. Next, a description will be made of a method of adjusting image color skews in manufacturing processes from the assembly of the exposing apparatus 10 to the building of it into the multicolor image forming apparatus 11, and a method of adjusting color skews at replacement of the exposing apparatus 10 on the market after shipment of the apparatus.

(Method of adjusting image color skews in manufacturing processes)

Figure 9A:
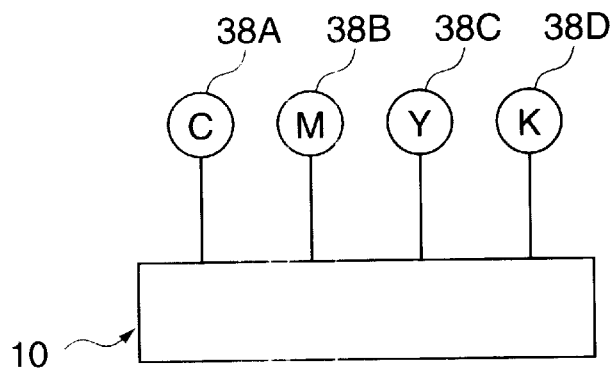
FIG. 9A is a cross-sectional view showing an exposing apparatus and photoreceptors of the multicolor image forming apparatus of the first embodiment of the present invention.
Figure 9B:
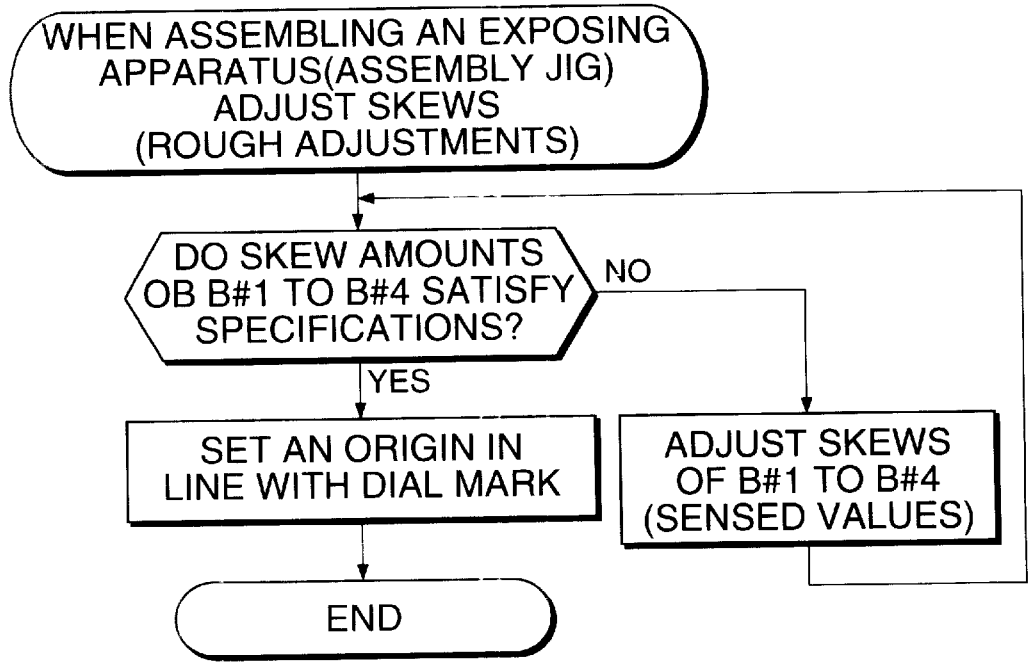
FIG. 9B is a flowchart showing an adjustment method at the assembling of an exposing apparatus.

First, as shown in FIG. 1, light beams 14A$a$ to 14D$a$ emitted from the exposing apparatus 10 scan sensors 96K, 96Y, 96M, and 96C of assembly adjusting jigs disposed in positions corresponding to the photoreceptors 38 (not shown in FIG. 1) of the multicolor image forming apparatus 11 to measure a skew amount with respect to a reference value. Thereafter, the dials 76 are operated and adjustments and inspection are repeated until a skew amount falls within the range of predetermined skew amounts (see the flowchart of FIG. 9B). Thereby, the light beams 14A$a$ to 14D$a$ emitted from the exposing apparatus 10 will be narrowed down within a certain range with respect to the reference value (completion of rough adjustments). After completion of the above adjustments, the scale plate 92 is attached to the second panel 86 so that the center line of the scale plate 92 is set at the position of the mark 76A of the dial 76 (setting of an origin in the flowchart. For example, screwing, attachment by adhesive tape, etc. The scale plate 92 attached to the second panel 86 in advance may be shifted in position or the scale plate 92 may be attached after completion of adjustments. Namely, any method may be used so long as the state of the adjusters 50 at completion of assembly of the exposing apparatus can be recognized.)

Figure 10A:
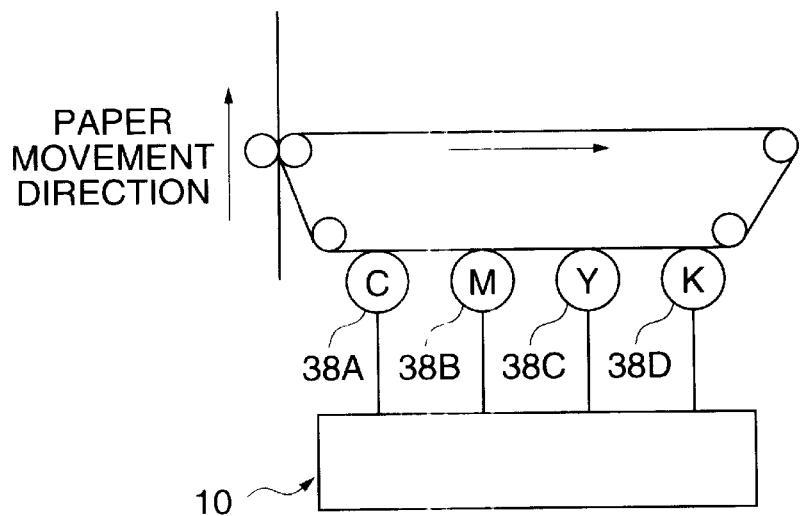
FIG. 10A is a cross-sectional view showing a schematic configuration of the multicolor image forming apparatus of the first embodiment of the present invention.
Figure 10B:
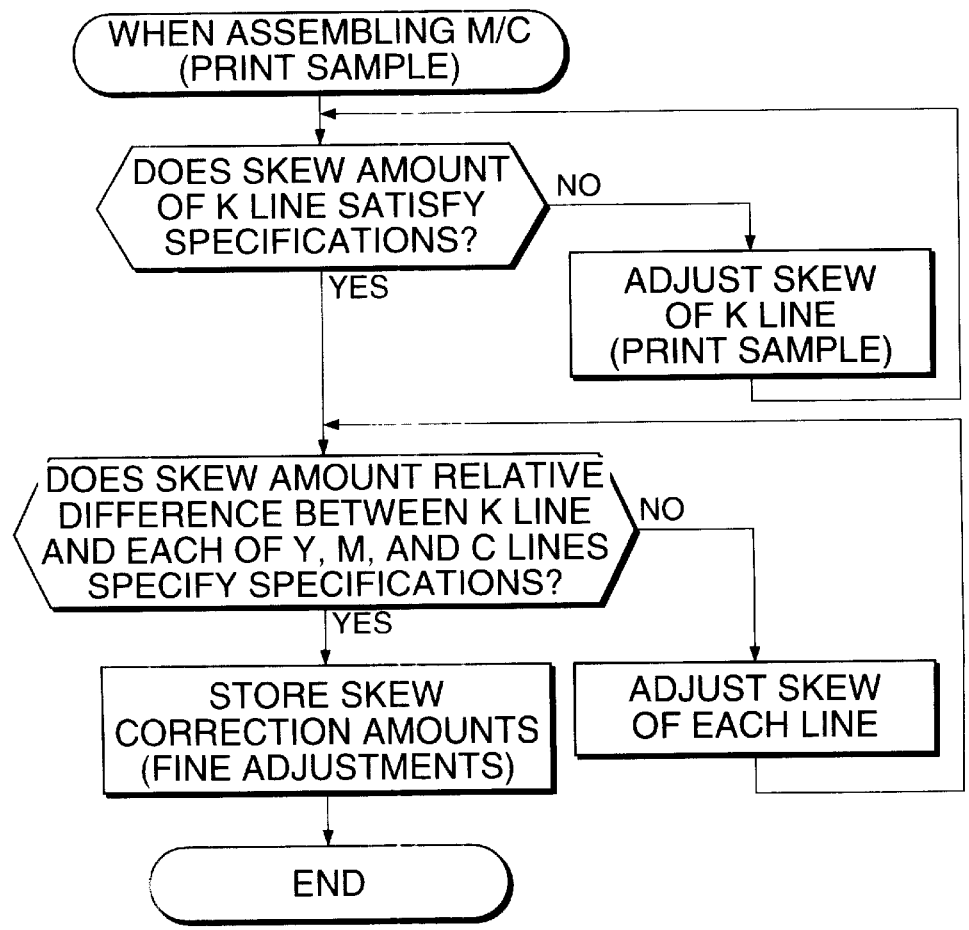
FIG. 10B is a flowchart for explaining a method of adjusting an exposing apparatus mounted in an image forming apparatus.
Figure 11:
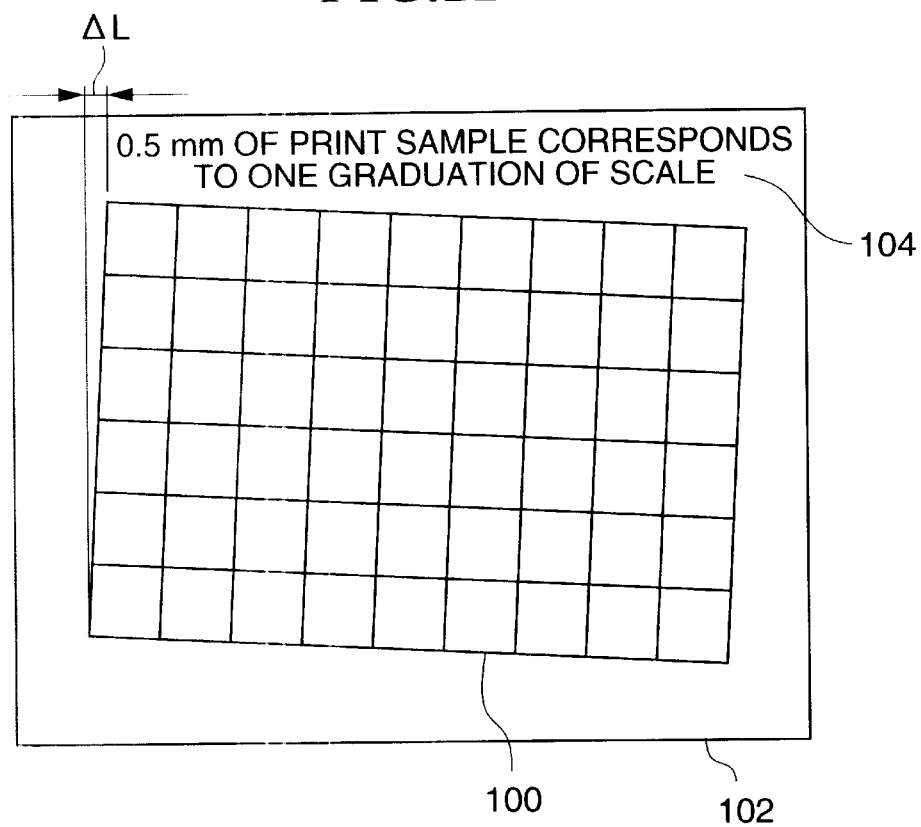
FIG. 11 is a plane view of a print sample of black.
Figure 12:
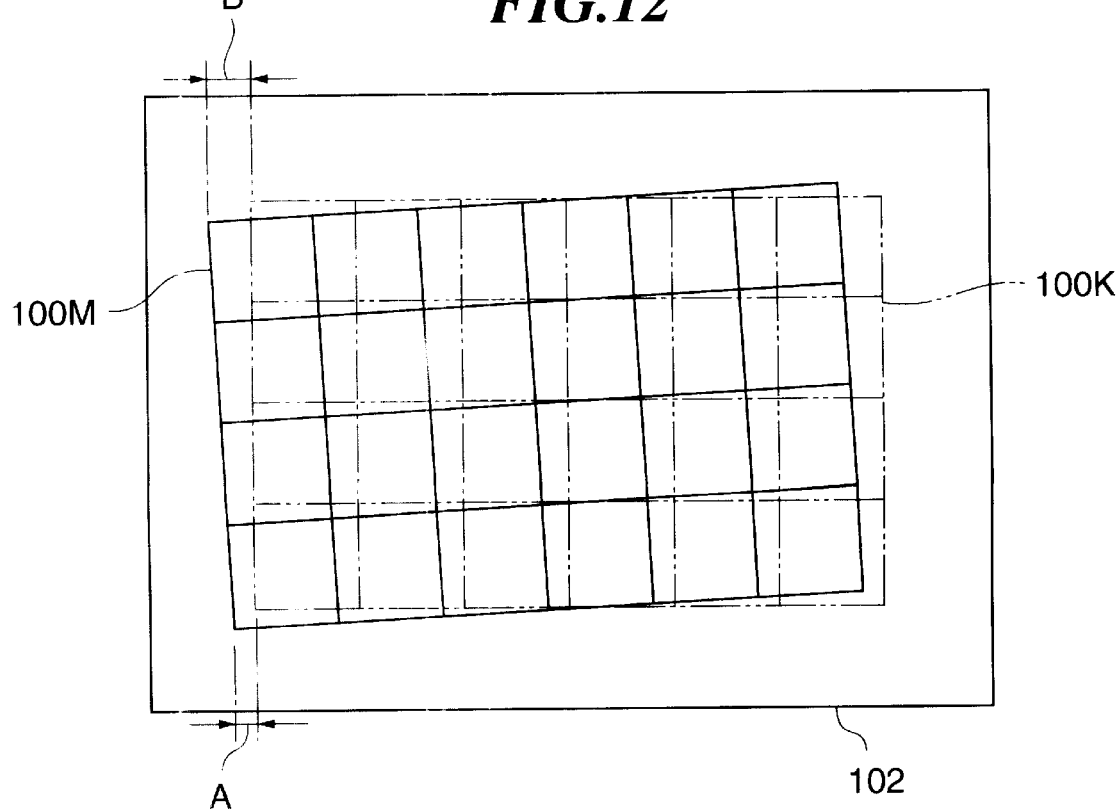
FIG. 12 is a plane view of a print sample of black and magenta.

Next, in this state, each digital display device 94 is set to a numeric value 0 (reset). Upon completion of the building of the exposing apparatus 10 into the multi-value image forming apparatus 11, the operation of adjusting image color skews due to an axis deviation of the photoreceptors 38A to 38D is started (see the flowchart shown in FIG. 10B). The image color skews are manually corrected by an operator with reference to a print sample as previously described. First, when it is assumed that a reference color is, e.g., black (K), a grid-shaped black toner image 100K (K lines) as shown in FIG. 11 is printed to measure an image skew amount ΔL and the dial 76 is operated for adjustments so that the image skew amount ΔL is within the range of reference values. At this time, preferably an adjustment amount (rotation angle, namely, a proper number of graduations on the scale plate 92) of the dial 76 corresponding to a color skew amount ($\mu$m or mm) on the print sample 102 is described in an instruction manual for the image forming apparatus, or as shown in FIG. 11, a description to indicate the length of a grid interval (0.5 mm in this embodiment) is provided on the print sample 102. This facilitates the adjustment operation. After the adjustments, again, the grid-shaped black toner image 100K is output onto the print sample 102 to see if an image skew amount is within the range of reference values. Thereafter, as shown in FIG. 12, the adjusted black toner image 100K and a grid-shaped toner image 100M of another color such as magenta (M) are printed out, a color skew amount (B–A) with respect to the black toner amount 100K is defined as a color skew of magenta, adjustments of magenta are performed as with black, and the adjustment operation is repeated until a color skew with black ultimately falls within the range of reference values. At this time, if there is no color skew, adjustments are unnecessary.

Figure 13:
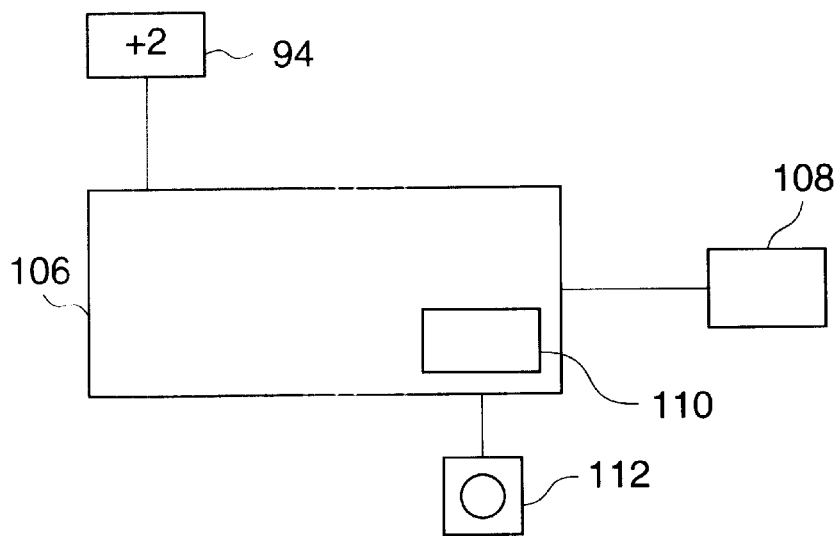
FIG. 13 is a block diagram related to a digital display device.

By repeating this operation for all colors, the operation of adjusting image color skew amounts terminates. When the dial 76 is rotated by this adjustment operation, a movement amount of the mark 76A, that is, the same number as the number of graduations on the scale plate 92 is displayed in the digital display device 94. When the dial 76 is rotated clockwise, a plus sign is displayed in the digital display device 94; when the dial 76 is rotated counterclockwise, a minus sign is displayed. To the display device 94, as shown in FIG. 13, a control device 106 is coupled, and to the control device 106, a sensor 108 for detecting a rotation amount of the dial 76 is coupled. The control device 106 converts a rotation amount of the dial 76 into a numeric value based on information of the sensor 108 and stores the result in an internal memory 110 thereof to display it in the display device 94. The numeric value corresponding to a rotation amount is, unless a reset switch 112 is pressed, held in the memory 110 even if the power to the apparatus is turned off. In this embodiment, constructionally, when the dial 76 is rotated, a display of the digital display device 94 is automatically changed. However, if a rotation amount (the number of graduations on the scale plate 92) can be stored, such a digital display device 94 need not be used. For example, in an easy-to-view place in the second panel 86 or in the vicinity of it, a memo space (paper and the like are also allowed) for writing a rotation amount (the number of graduations) of the dial 76 may be allocated so that a rotation amount (the number of graduations) of the dial 76 may be written therein. Alternatively, a switch button for incrementing or decrementing numeric values may be provided so that digitally displayed values can be changed by handling the switch button. This terminates image color skew correction after building the exposing apparatus 10 into the multicolor image forming apparatus 11.

Figure 14:
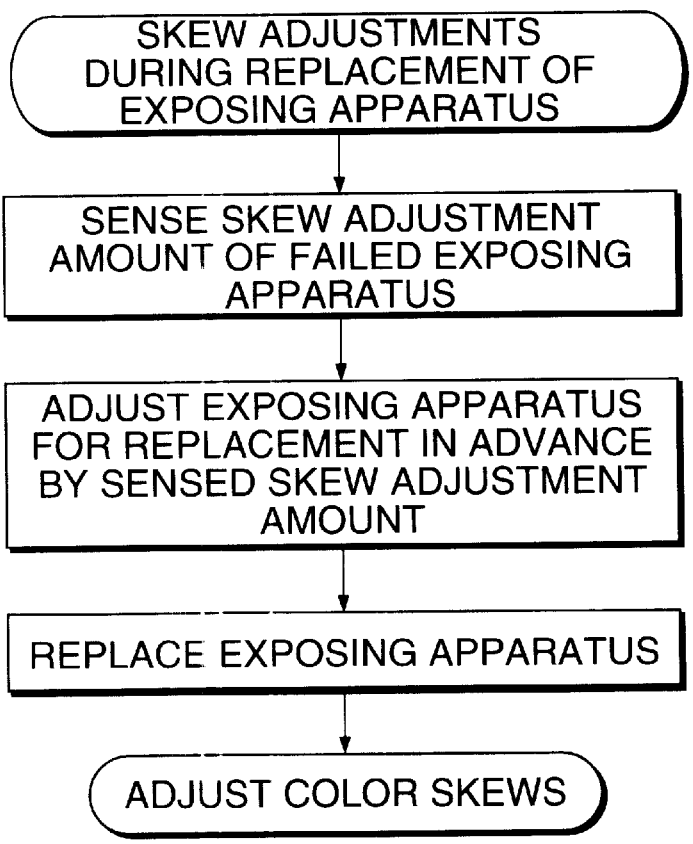
FIG. 14 is a flowchart showing an adjustment method at replacement of an exposing apparatus.
Figure 15:
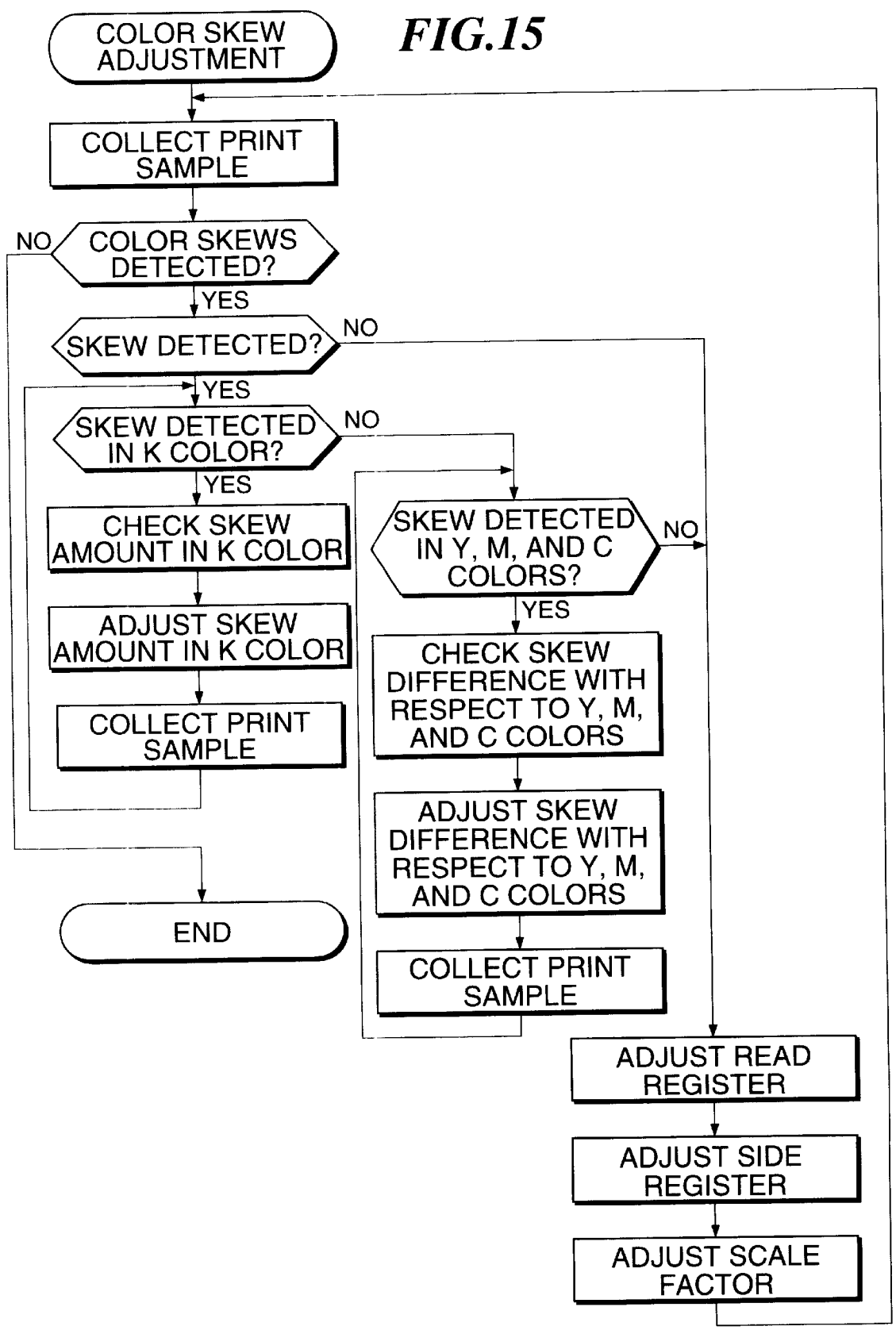
FIG. 15 is a flowchart showing a continuation of the adjustment method shown in FIG. 14.

It goes without saying that, if the photoreceptors 38A to 38D are replaced due to degradation in the market, the above adjustment operation must be performed to change a previously stored numeric value to a new adjustment value. If the exposing apparatus 10 fails in the market and needs to be replaced, operations are performed as shown by the flowcharts of FIGS. 14 and 15. Specifically, the operator in advance reads a value (displayed in the digital display device 94. Skew adjustment value) stored in the failed exposing apparatus 10, rotates the dial 76 of a new exposing apparatus 10 for replacement before a replacement operation, and sets a numeric value displayed in the digital display device 94 of the new exposing apparatus 10 equal to the value read from the filed apparatus. Finally, the operator needs to obtain a print sample to adjust color skews (final fine adjustments).

The dials 76 and other components of the adjusting apparatus 50 are, as shown in FIG. 3, preferably constructed to be operable when an independent cover 114 used during adjustments is opened. The cover 114 is openable and closable with the lower end supported by a hinge 113, and a concave portion (space) inside the cover 114 is an operation part necessary to rotate the dial 76. The multicolor image forming apparatus 11 is covered with outer covers 115A, 115B, 115C, and 115D in outer portions thereof except the cover 114.

By disposing a mechanically driven part 116 of the multicolor image forming apparatus 11 and a fixing unit 118 thereof as a heating source in safe places (positions distant from the operation part in which the dials 76 are provided), such as the rear (the direction of the arrow B) of the image forming apparatus 11 and the upper portion thereof, respectively, even if the image forming apparatus 11 is energized, the above described adjustment operation can be performed without disassembling the image forming apparatus 11. The rings 90 provided in the screw part 78 of the dial 76 abut the first panel 82 or the second panel 86 to limit the movement of the screw part 78. This helps to prevent troubles due to excessive rotation of the dial 76. Furthermore, the second panel 86, the rings 90 provided in the screw part 78, and the like have the effect of shading. Preferably, there is provided in the vicinity of the adjusting apparatus 50 (the inside surface of the cover 114, etc.) a description of action to be taken when image color skews cannot be corrected beyond an adjustment range. Examples of action to be taken may include reporting to a service center and directions to reset settings of all adjusting parts and retry adjustments of image color skews from the beginning. Although the screw part 78 is constructed to be rotated by the dial 76 in this embodiment, the dial 76 need not necessarily be provided. As an alternative to the dial 76, for example, a groove or hexagonal hole may be provided in the end of the screw part 78 so that the screw part 78 can be rotated by a slotted screwdriver or Allen key.

[Second Embodiment]

Figure 16:
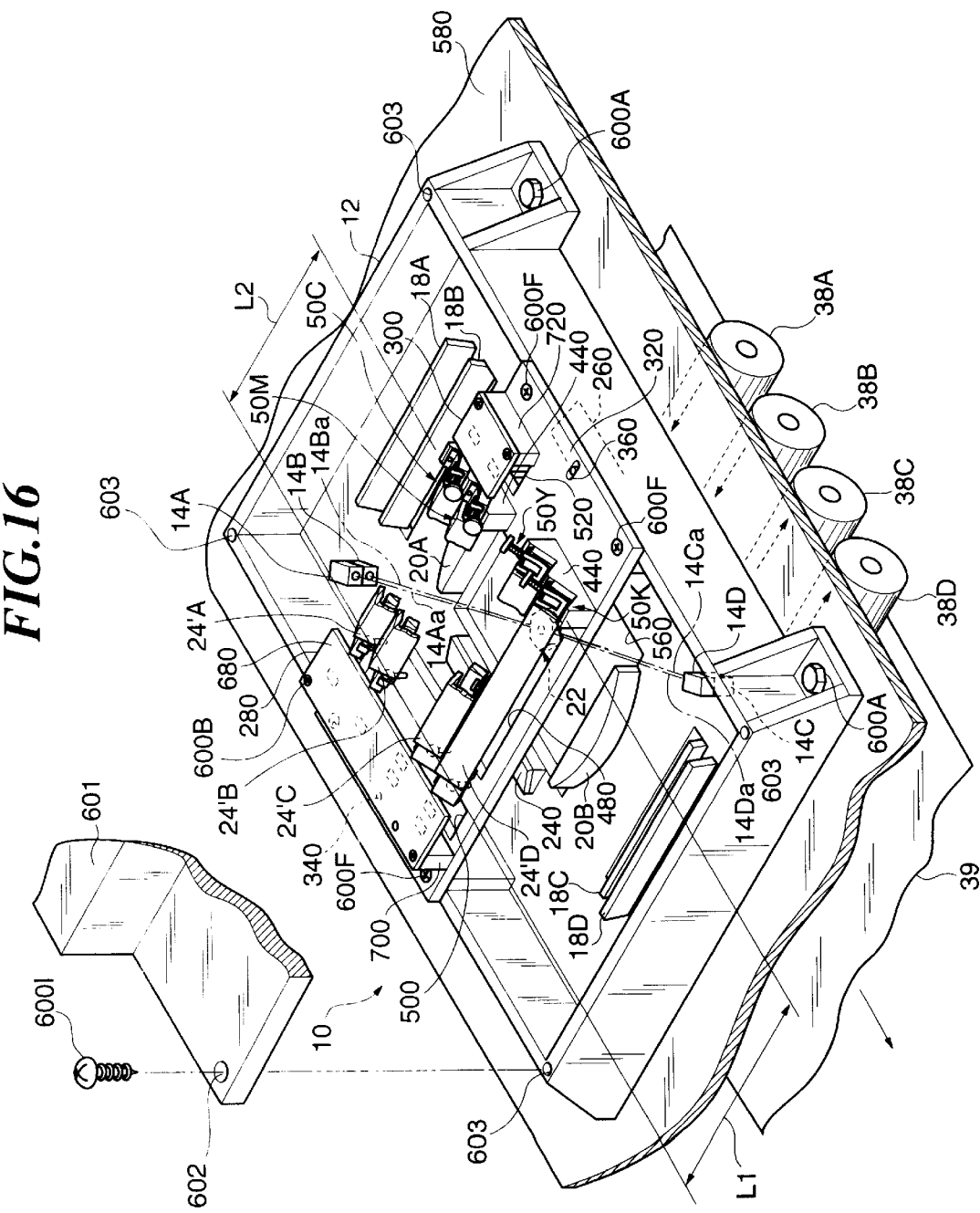
FIG. 16 is a perspective view of an exposing apparatus according to a second embodiment of the present invention, mounted in the multicolor image forming apparatus.

A second embodiment of the present invention will be described with reference to FIGS. 16 to 22. FIG. 16 is a perspective view of an exposing apparatus according to the second embodiment provided in a full-color multicolor image forming apparatus (so-called color copier, color printer, etc.). In FIG. 16, the reference numeral 10 designates an exposing apparatus; 601, an exposing apparatus cover (rupture cross-section); 600I, a screw; 602, holes; 603, cover mounting holes; 14A, 14B, 14C, and 14D, light sources; 14A$a$, 14B$a$, 14C$a$, and 14D$a$, laser beams; 22, a deflector provided with a polygon mirror 26; 20A and 20B, fθ lenses; 18A, 18B, 18C, and 18D, reflecting mirrors; 24'A, 24'B, 24'C, and 24'D, cylindrical mirror assemblies; 240, a first pickup mirror; 260, a second pickup mirror; 280, a synchronous light and sub scanning position detecting apparatus; 300, a synchronous light detecting apparatus; 320, a subframe plate; 340, a round hole of the plate 320; 360, a rectangular hole of the plate 320; 400, a supporting part; 50K, 50Y, 50M, and 50C, adjusting apparatuses; 440, positioning blocks; 38A, 38B, 38C, and 38D, photoreceptors provided in the multicolor image forming apparatus; 480, a first window of the plate 320; 500, a second window of the plate 320; 520, a third window of the plate 320; 12, a housing accommodating optical systems of the exposing apparatus 10; 560, a fourth window of the plate 320; 580, a frame of the multicolor image forming apparatus for securing the exposing apparatus 10; 600A to 600I, screws; and 604, a cylindrical mirror plate assembly. The drawing shows the exposing apparatus with the exposing apparatus cover 601 removed. When the exposing apparatus cover 601 is closed, the exposing apparatus cover 601 is bonded to the cover mounting holes 603 provided in the housing 12 through the holes 602 by the screws 600I. At that time, the skew adjustment dials 76'K, 76'Y, 76'M, and 76'C are exposed from the exposing apparatus cover 601. Therefore, adjustments can be performed easily without removing the exposing apparatus cover.

Figure 17:
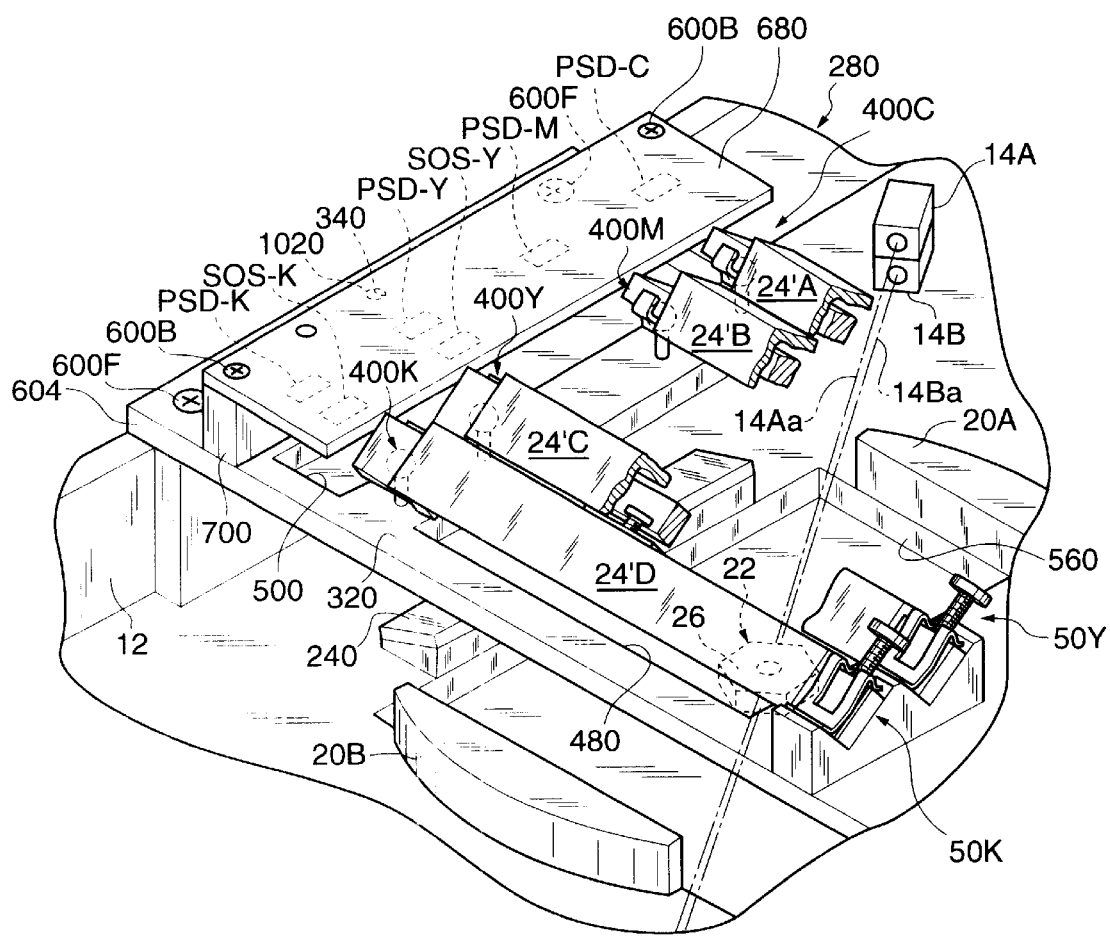
FIG. 17 is an enlarged perspective view of the exposing apparatus shown in FIG. 16 in the vicinity of a synchronous light and sub scanning position detecting apparatus.
Figure 18:
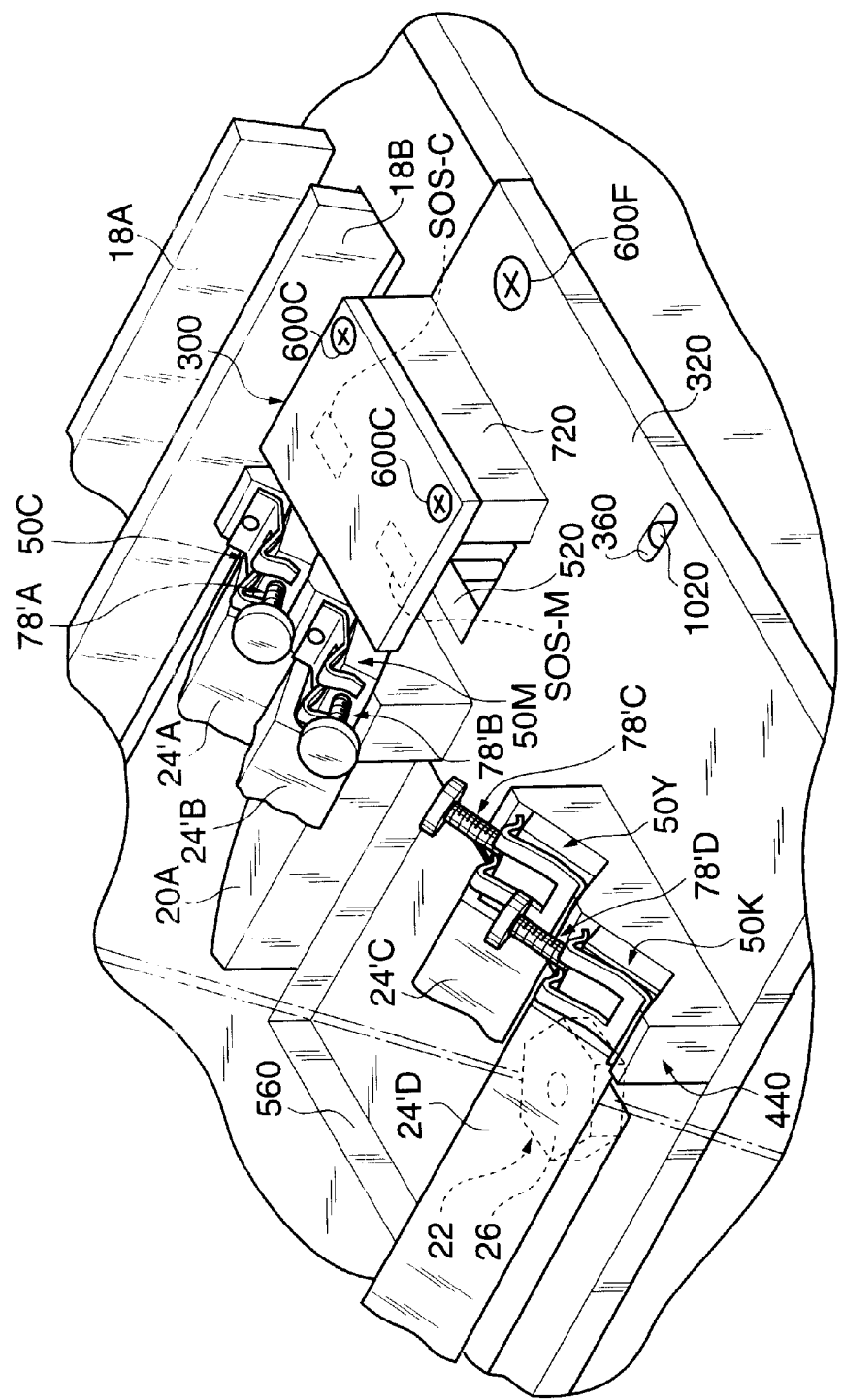
FIG. 18 is an enlarged perspective view of the exposing apparatus shown in FIG. 16 in the vicinity of a synchronous light detecting apparatus.
Figure 19:
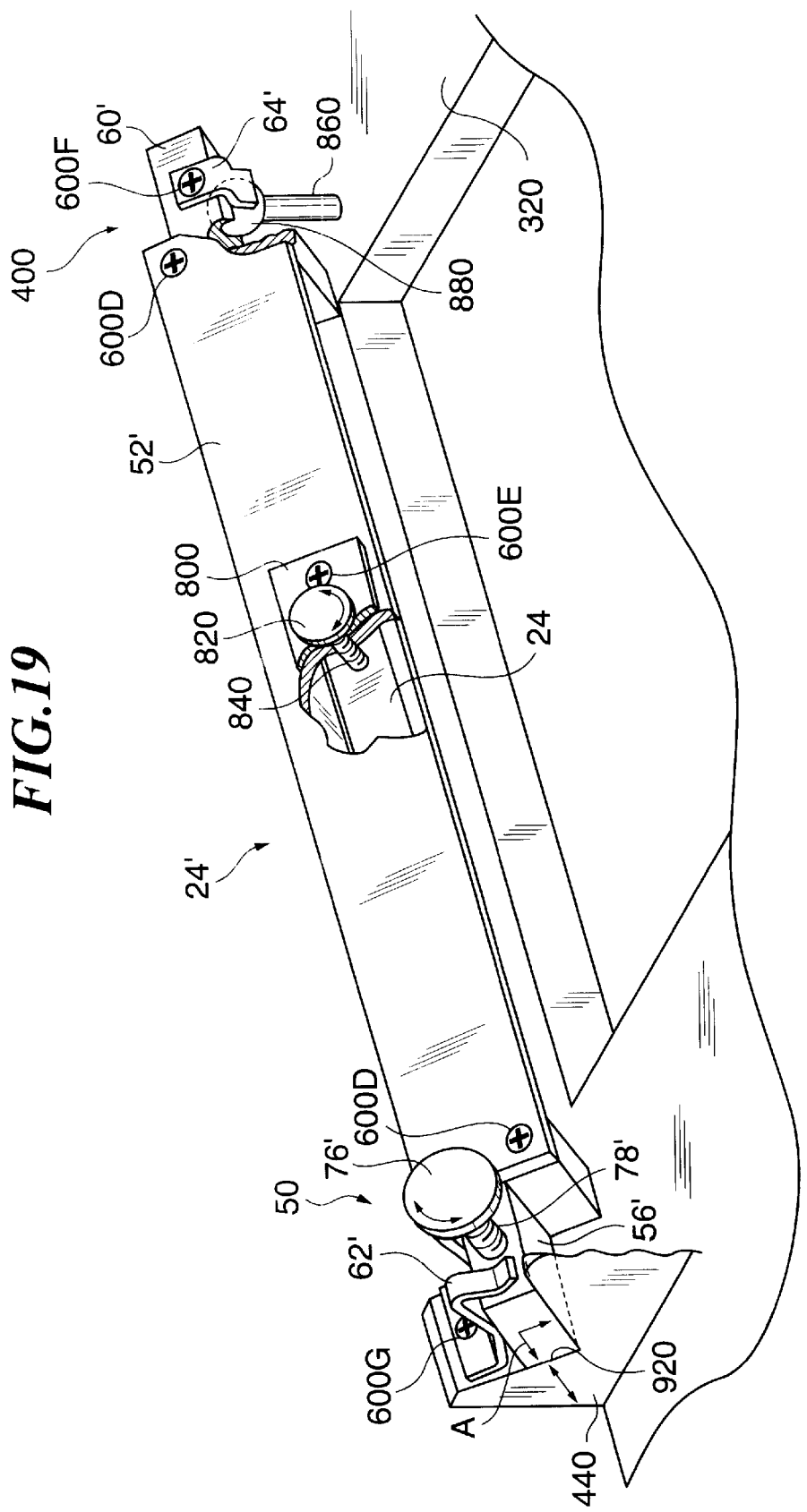
FIG. 19 is a perspective view of a cylindrical mirror assembly.
Figure 20:
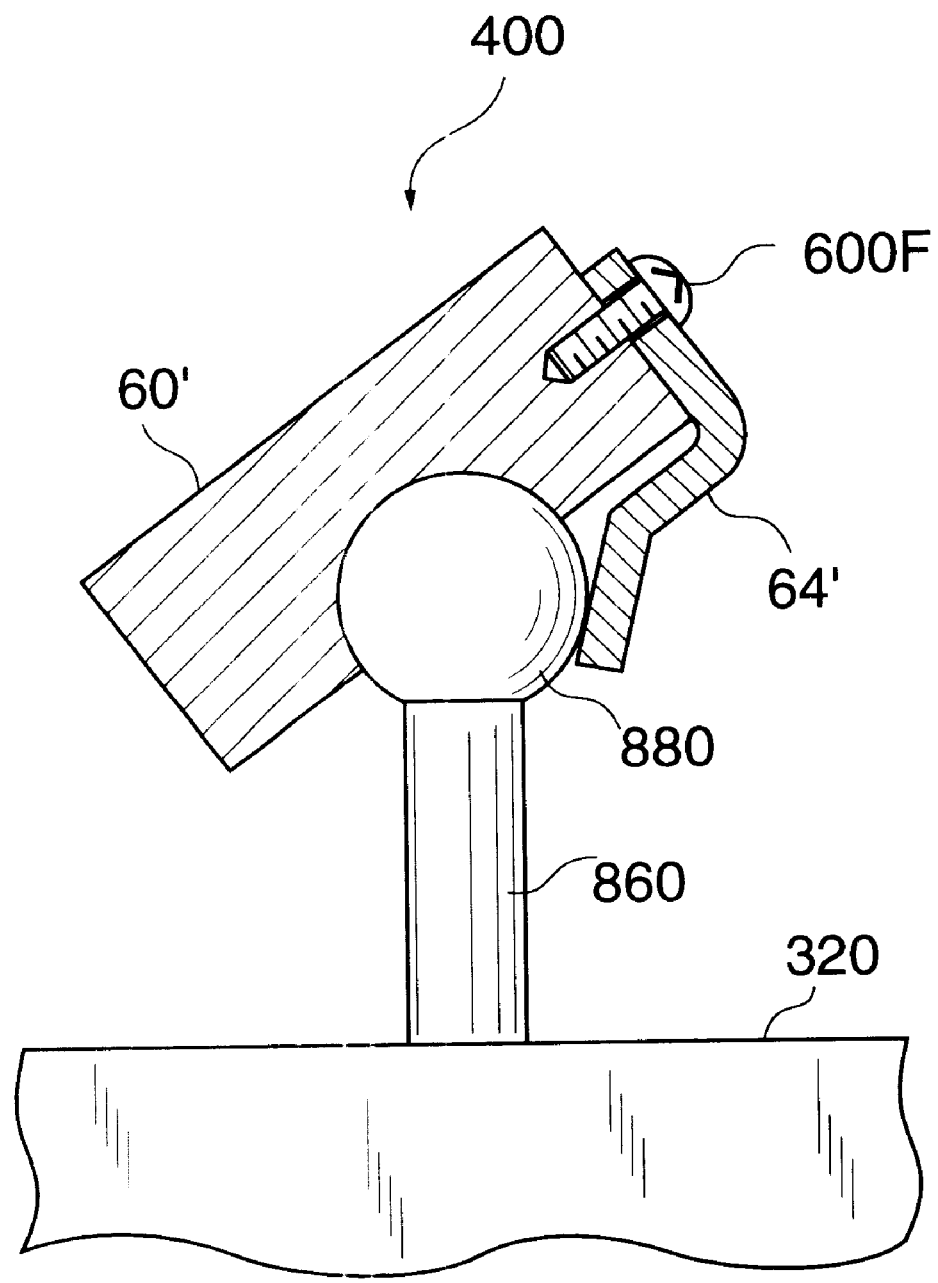
FIG. 20 is a cross-sectional view of a supporting part of a cylindrical mirror assembly.

The exposing apparatus 10 scans four laser beams 14A$a$, 14B$a$, 14C$a$, and 14D$a$ on the photoreceptors 38D, 38C, 38B, and 38A corresponding to black, yellow, magenta, and cyan by one deflector 22, and multiple images are transferred onto the transfer belt 39 from the photoreceptors 38D, 38C, 38B, and 38A, whereby a color image is formed. The exposing apparatus 10 is accurately secured to the frame 580 of the multicolor image forming apparatus by the screws 600A. Laser beams 14A$a$, 14B$a$, 14C$a$, and 14D$a$ containing information, emitted from the light sources 14A, 14B, 14C, and 14D, are scanned by the deflector 22, pass through the fθ lenses 20A and 20B, are reflected in the reflecting mirrors 18A, 18B, 18C, and 18D, and the cylindrical mirror 24 built into the cylindrical mirror assembly 24', pass through the first window 480 of the plate 320, and are irradiated straightly to the photoreceptors 38D, 38C, 38B, and 38A. In FIG. 16, the dotted arrows on the photoreceptors 38D, 38C, 38B, and 38A indicate scanning directions. The synchronous light and sub scanning position detecting apparatus 280 is provided in the lower surface with a synchronous light detecting sensor SOS-K for detecting a write timing of the laser beam 14A$a$ and a synchronous light detecting sensor SOS-Y for detecting a write timing of the laser beam 14B$a$. The synchronous light detecting apparatus 300 is provided in the lower surface with a synchronous light detecting sensor SOS-M for detecting a write timing of the laser beam 14C$a$ and a synchronous light detecting sensor SOS-C for detecting a write timing of the laser beam 14D$a$. The synchronous light detecting apparatus 300 is accurately secured to the plate 320 through the support 720 by the screws 600C. The laser beams 14A$a$ and 14B$a$ reflected in the vicinity of an end portion of the cylindrical mirror 24 at the synchronous light and sub scanning position detecting apparatus 280 are directed into the first pickup mirror 240 and reflected therein, pass through the second window 500 of the plate 320, and are incident upon and detected by the synchronous light detecting sensors SOS-K and SOS-Y. Laser beams incident upon the synchronous light detecting sensors SOS-K and SOS-Y are called SOS light beams. On the other hand, the laser beams 14C$a$ and 14D$a$ reflected in the vicinity of an end portion of the cylindrical mirror 24 on the synchronous light detecting apparatus 300 side are directed into the second pickup mirror 260 and reflected therein, pass through the third window 520 of the plate 320, and are incident upon and detected by the synchronous light detecting sensors SOS-M and SOS-C, and then scanned and irradiated onto the photoreceptors 38B and 38A with a given delay. By the way, with respect to the laser beams 14A$a$ and 14B$a$ from the light sources 14A and 14B, as shown in FIGS. 16 and 17, the light source 14A is mounted on the light source 14B and the incident angles of the laser beams incident upon the polygon mirror 26 of the deflector 22 are different in cross-section direction (cross section along the rotary axis of the polygon mirror 26). In this embodiment, the laser beam 14A$a$ is greater than the laser beam 14B$a$ in incident angle to the polygon mirror 26. Accordingly, after passage through the fθ lens 20A, the laser beams 14A$a$ and 14B$a$ can be separated into the reflecting mirrors 18B and 18A, respectively. This is also the same for the light sources 14C and 14D across the deflector 22. As shown in FIG. 17, the synchronous light and sub scanning position detecting apparatus 280 has a sub scanning position detecting sensor PSD-K and a synchronous light detecting sensor SOS-K for black scanning lines, a sub scanning position detecting sensor PSD-Y and a synchronous light detecting sensor SOS-Y for yellow scanning lines, a sub scanning position detecting sensor PSD-M for magenta scanning lines, and a sub scanning position detecting sensor PSD-C for cyan scanning lines. These sensors are formed on one board 680 and accurately secured to the plate 320 through the support 700 by the screws 600B. A skew of the laser beams 14A$a$, 14B$a$, 14C$a$, and 14D$a$ in the sub scanning direction is detected by these sub scanning position detecting sensors PSD-K, PSD-Y, PSD-M, and PSD-C; namely, a skew of the laser beams 14A$a$, 14B$a$, 14C$a$, and 14D$a$ in the sub scanning direction can be detected within the exposing apparatus 10. Information about a skew of the laser beams 14A$a$, 14B$a$, 14C$a$, and 14D$a$ in the sub scanning direction, detected by these sub scanning position detecting sensors PSD-K, PSD-Y, PSD-M, and PSD-C is used to operate a write timing of the laser beams 14A$a$, 14B$a$, 14C$a$, and 14D$a$, whereby the skew in the sub scanning direction can be corrected. For example, information obtained by the sub scanning position detecting sensors PSD-K, PSD-Y, PSD-M, and PSD-C is inputted to a control device (not shown) to control the light sources 14A, 14B, 14C, and 14D, and an emission timing of the laser beams 14A$a$, 14B$a$, 14C$a$, and 14D$a$ from the light sources 14A, 14B, 14C, and 14D is hastened or delayed by one scanning line or plural scanning lines, whereby a skew in the sub scanning direction can be corrected. As shown in FIG. 19, the cylindrical mirror assemblies 24'A, 24'B, 24'C, and 24'D include a second holding part 60', a first holding part 56', and a holder 52', which are accurately assembled with screws 600D. The cylindrical mirror 24 is accurately held to the second holding part 60' at one end and to the first holding part 56' at another end. A stud 800 is secured by a screw 600E in the central part of the holder 52' in a longitudinal direction, the screw part 840 of a bow adjustment dial 820 is screwed to the screw hole of the stud 800, and the central part of the cylindrical mirror 24 in a longitudinal direction is bent along a reflecting interface direction, whereby bow adjustments can be performed. In the holder 52', a screw hole to screw the screw 600E in and a through-hole (both are not shown) through which the screw part 840 of the bow adjustment dial 820 pierces are formed. In the cylindrical mirror assembly 24', as shown in FIG. 20, the second holding part 60' is mated to a spherical part 880 of a supporting part 860 accurately provided in a predetermined position of the plate 320, in a state pressed by a supporting spring 64' fitted to the second holding part 60' by the screw 600F. Also, as shown in FIG. 19, in the cylindrical mirror assembly 24', the first holding part 56' is pressed against a V-shaped groove 920 of a positioning block 440 accurately provided in a predetermined position of the plate 320, by an adjustment spring 62' mounted in the positioning block 440 by a screw 600G (in the direction indicated by the arrow). In the first holding part 56', the screw part 78' of the skew adjustment dial 76' is screwed along the reflecting interface direction of the cylindrical mirror 24 and pierces. By rotating the skew adjustment dial 76', with the spherical part 880 of the holding part 400 as a rotation fulcrum, the cylindrical mirror assembly 24' can be rotated along the reflecting interface direction of the cylindrical mirror 24 to perform skew adjustments. All of the four rotation fulcrums (spherical parts 880) of the cylindrical mirror assemblies 24'A, 24'B, 24'C, and 24'D are provided on the same side, that is, on a side on which the sub scanning position detecting sensors PSD-K, PSD-Y, PSD-M, and PSD-C are provided. These cylindrical mirror assemblies 24'A, 24'B, 24'C, and 24'D, the synchronous light and sub scanning position detecting apparatus 280, and the synchronous light detecting apparatus 300 are integrally mounted in the plate 320 to constitute the cylindrical mirror plate assembly 604. The cylindrical mirror plate assembly 604 is accurately positioned with the round hole 340 and rectangular hole 360 engaged with the pins 1020 of the housing 12 (see FIGS. 17 and 18) and secured by screws 600H.

Figure 21A:
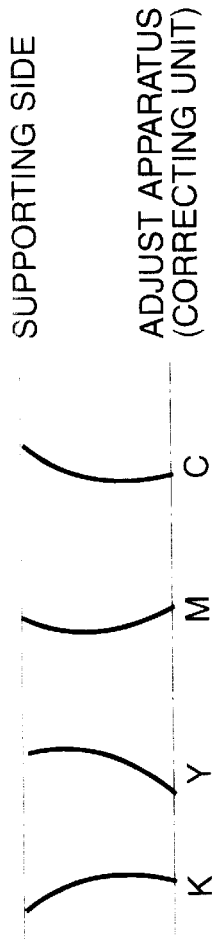
FIGS. 21A to 21D are an illustration of a procedure for correcting scanning lines.
Figure 21B:
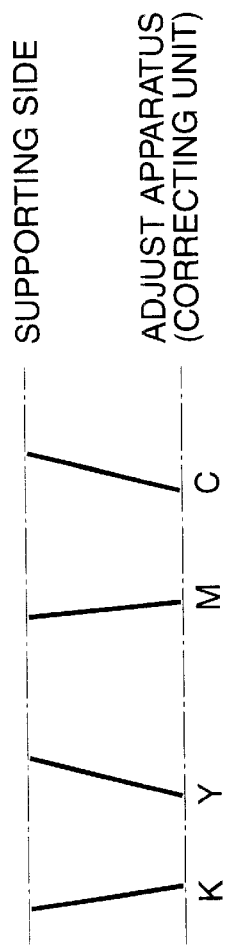
Figure 21C:
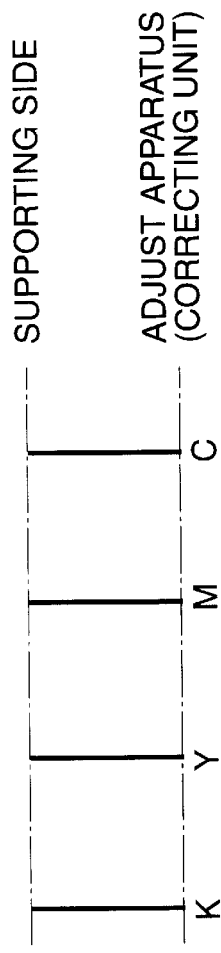
Figure 21D:
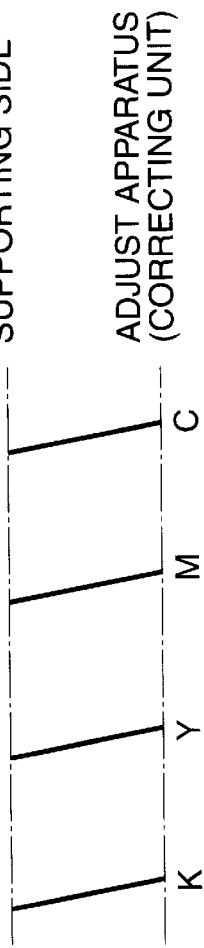

Next, correction of bows and skews will be described with reference to FIG. 12. FIG. 21A shows the state in which each scanning line has a bow and a skew. The bows are removed as shown in FIG. 21B by a bow adjustment dial 820 of each of the cylindrical mirror assemblies 24'A, 24'B, 24'C, and 24'D. By adjusting the directions and amount of the skews as shown in FIG. 21C or 21D by a skew adjustment dial 76' of each of the cylindrical mirror assemblies 24'A, 24'B, 24'C, and 24'D, a color image free from color skew can be formed. As previously described, since the rotation fulcrums (spherical parts 880) of the cylindrical mirror assemblies 24'A, 24'B, 24'C are provided on the same side and on the side on which the sub scanning position detecting sensors PSD-K, PSD-Y, PSD-M, and PSD-C are provided, the multicolor image forming apparatus has only to be provided with a maintenance space on only the side of the adjusting apparatus 50. As a result, the multicolor image forming apparatus provided with the exposing apparatus 10 can be miniaturized. Furthermore, since the rotation fulcrums (spherical parts 880) of the cylindrical mirror assemblies 24'A, 24'B, 24'C are provided on the same side and on the side on which the sub scanning position detecting sensors PSD-K, PSD-Y, PSD-M, and PSD-C are provided, and the cylindrical mirror assemblies 24'A, 24'B, 24'C, and 24'D turn along the reflecting interface direction of the cylindrical mirror 24, no influence is exerted on detection of skews of laser beams 14A$a$, 14B$a$, 14C$a$, and 14D$a$ in the sub scanning direction during skew correction. The sub scanning position detecting sensors PSD-K, PSD-Y, PSD-M, and PSD-C to detect skews of laser beams 14A$a$, 14B$a$, 14C$a$, and 14D$a$ in the sub scanning direction after reflection by the cylindrical mirror 24 are provided to detect skews of laser beams 14A$a$, 14B$a$, 14C$a$, and 14D$a$ in the sub scanning direction within the exposing apparatus 10, and by operating a write timing of the laser beams 14A$a$, 14B$a$, 14C$a$, and 14D$a$ according to the information, the skews in the sub scanning direction can be corrected. Therefore, the skews in the sub scanning direction can be corrected without performing troublesome operations of, e.g., printing a registration mark on the transfer belt 39 and detecting it. Also, although not shown, without providing the synchronous light detecting sensors SOS-M and SOS-C, an apparatus to detect EOS (End of Scan) light may be provided in front of the sub scanning position detecting sensors PSD-M and PSD-C of the synchronous light and sub scanning position detecting apparatus 280, that is, in an open area close to the cylindrical mirror 24 of the board 680, in order to take synchronization by EOS light.

Figure 22A:
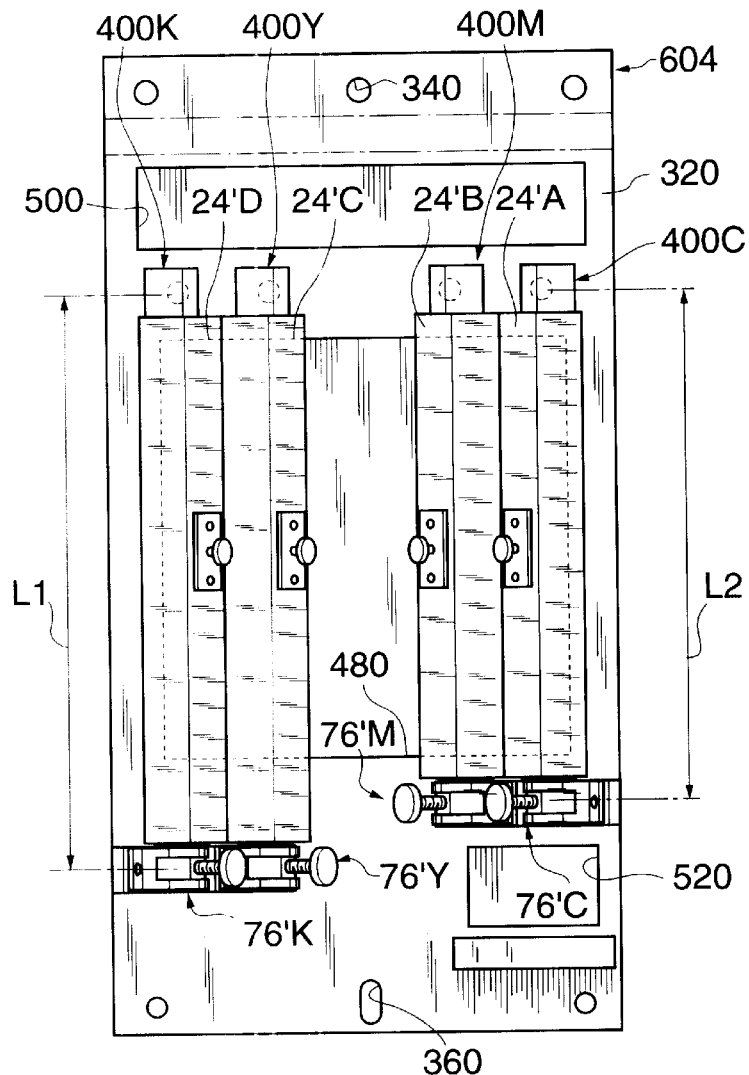
FIG. 22A is a plane view of a cylindrical mirror plate assembly.
Figure 22B:
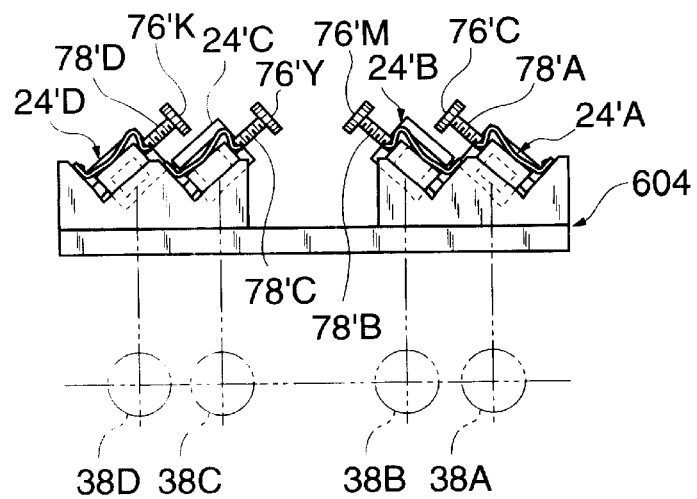
FIG. 22B is a side view thereof.
Figure 23:
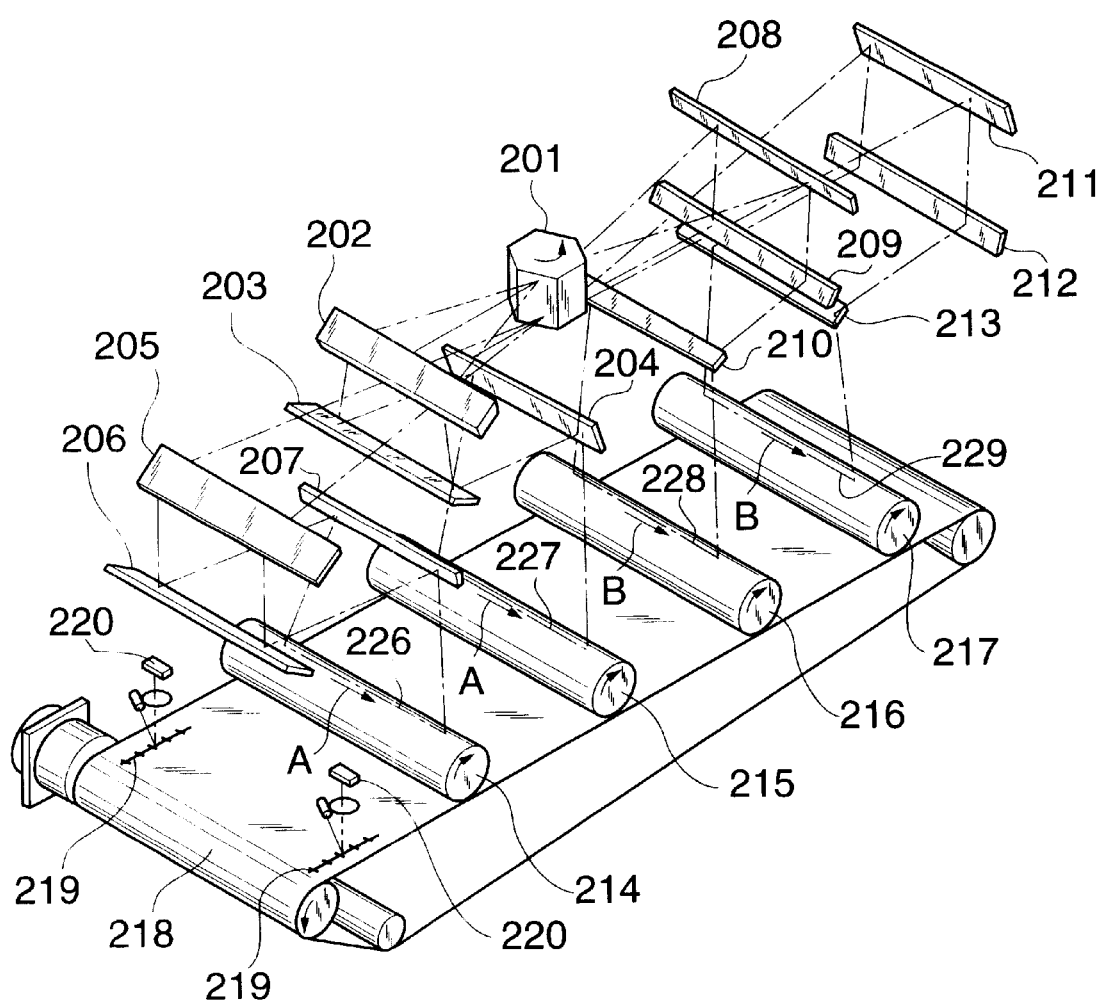
FIG. 23 is a perspective view showing a schematic configuration of a conventional image forming apparatus.
Figure 24:
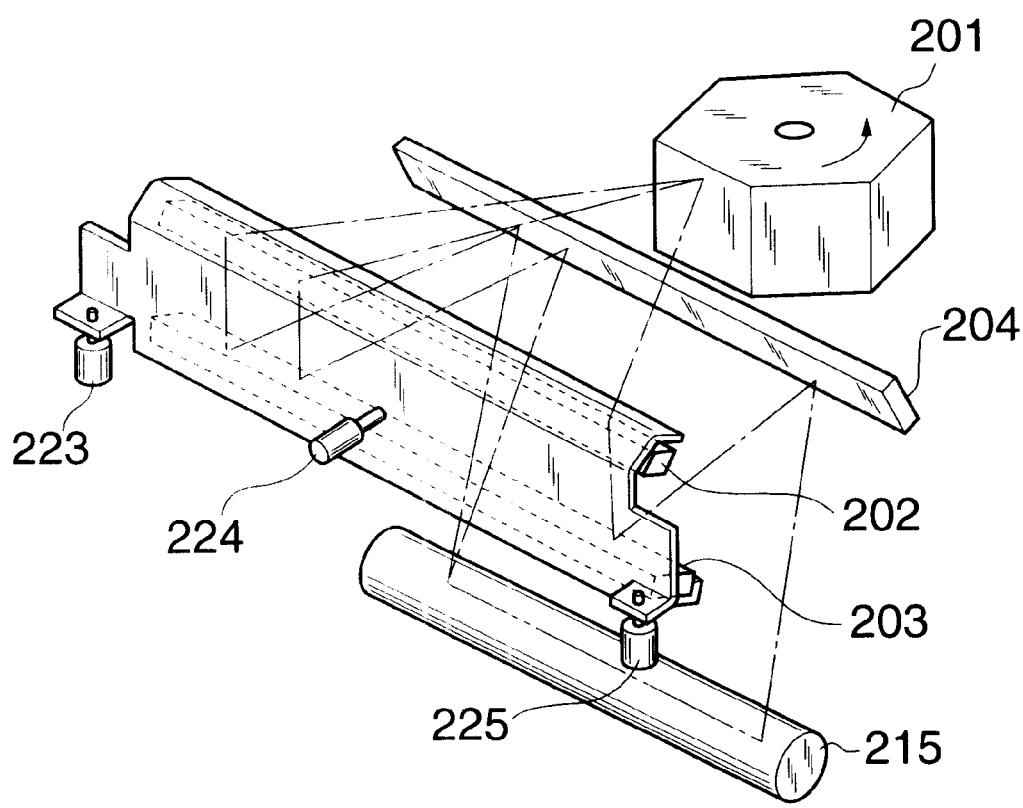
FIG. 24 is a perspective view of a conventional image forming apparatus in the periphery of a mirror adjustment mechanism.
Figure 25:
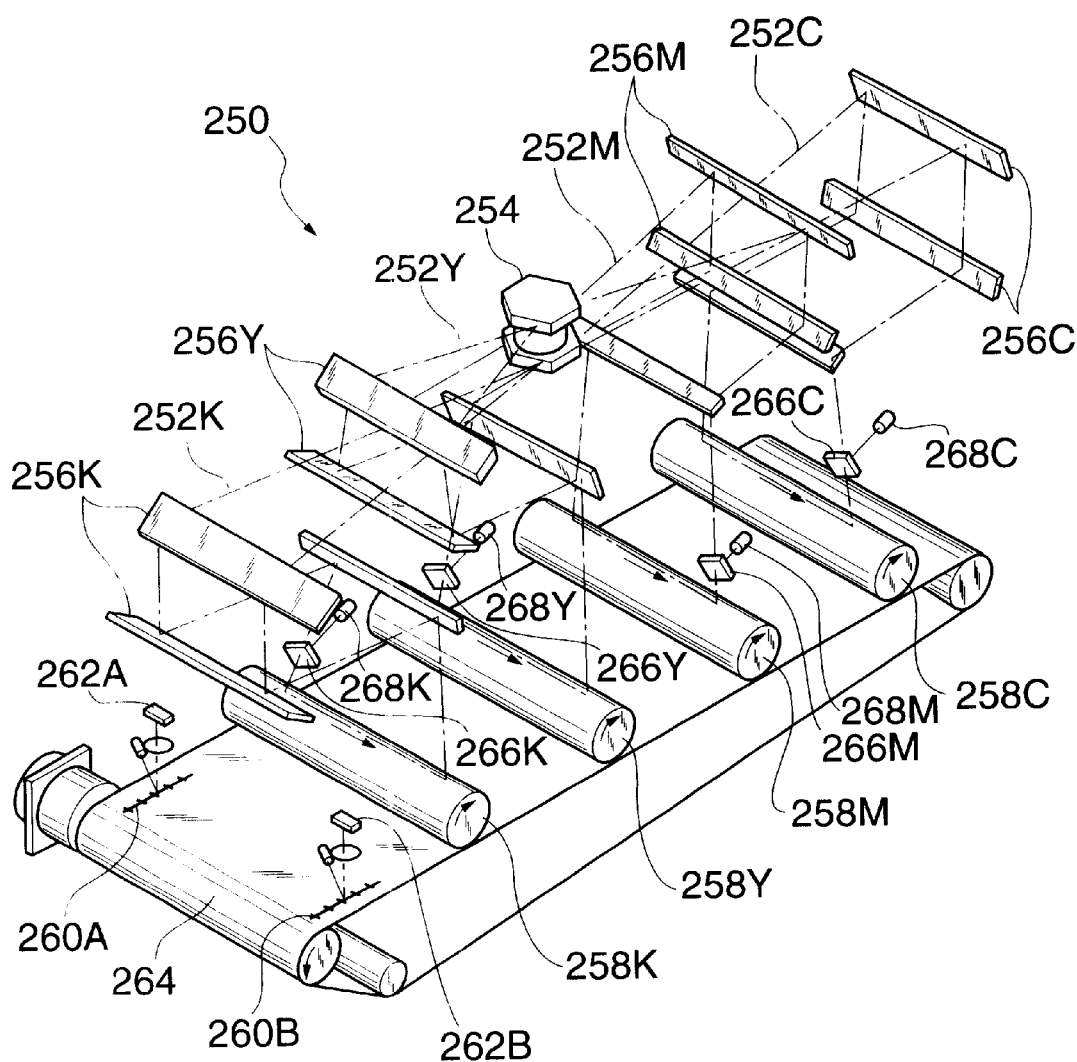
FIG. 25 is a perspective view of another conventional exposing apparatus.
Figure 26:
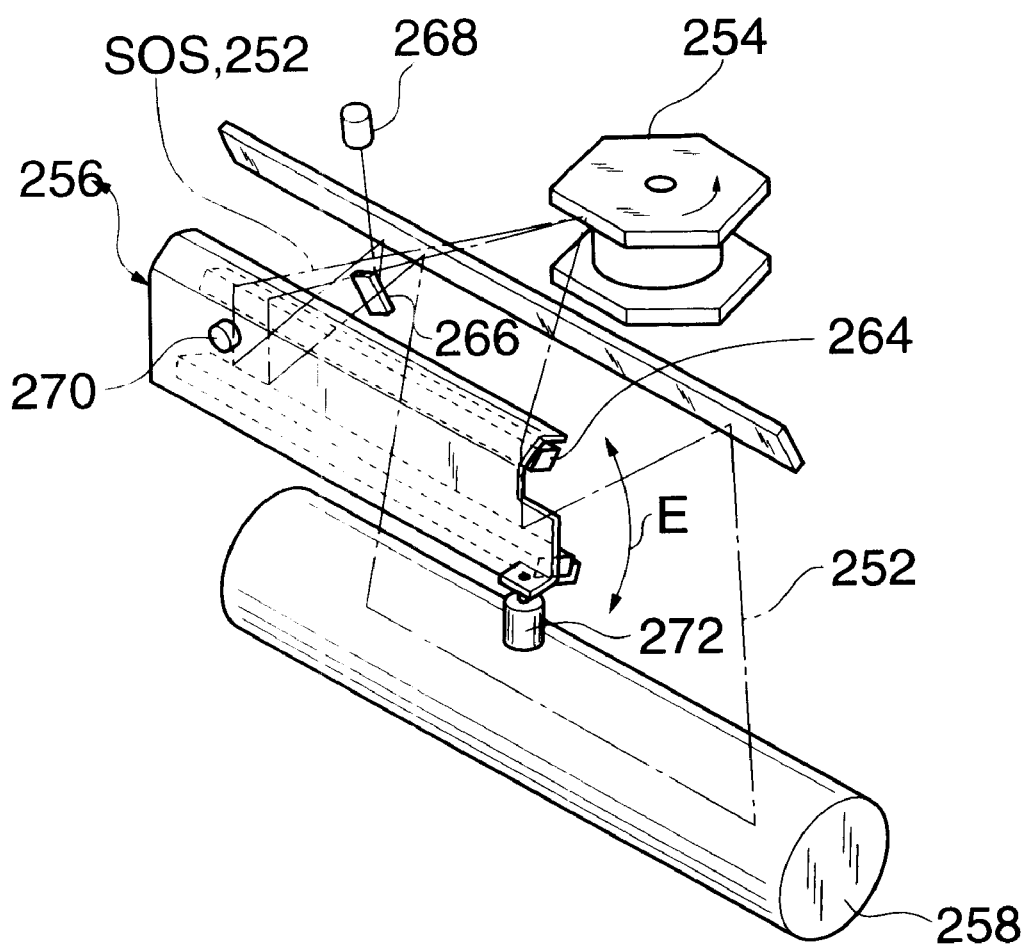
FIG. 26 is an enlarged perspective view of the exposing apparatus shown in FIG. 25 in the vicinity of a deflector.
Figure 27:
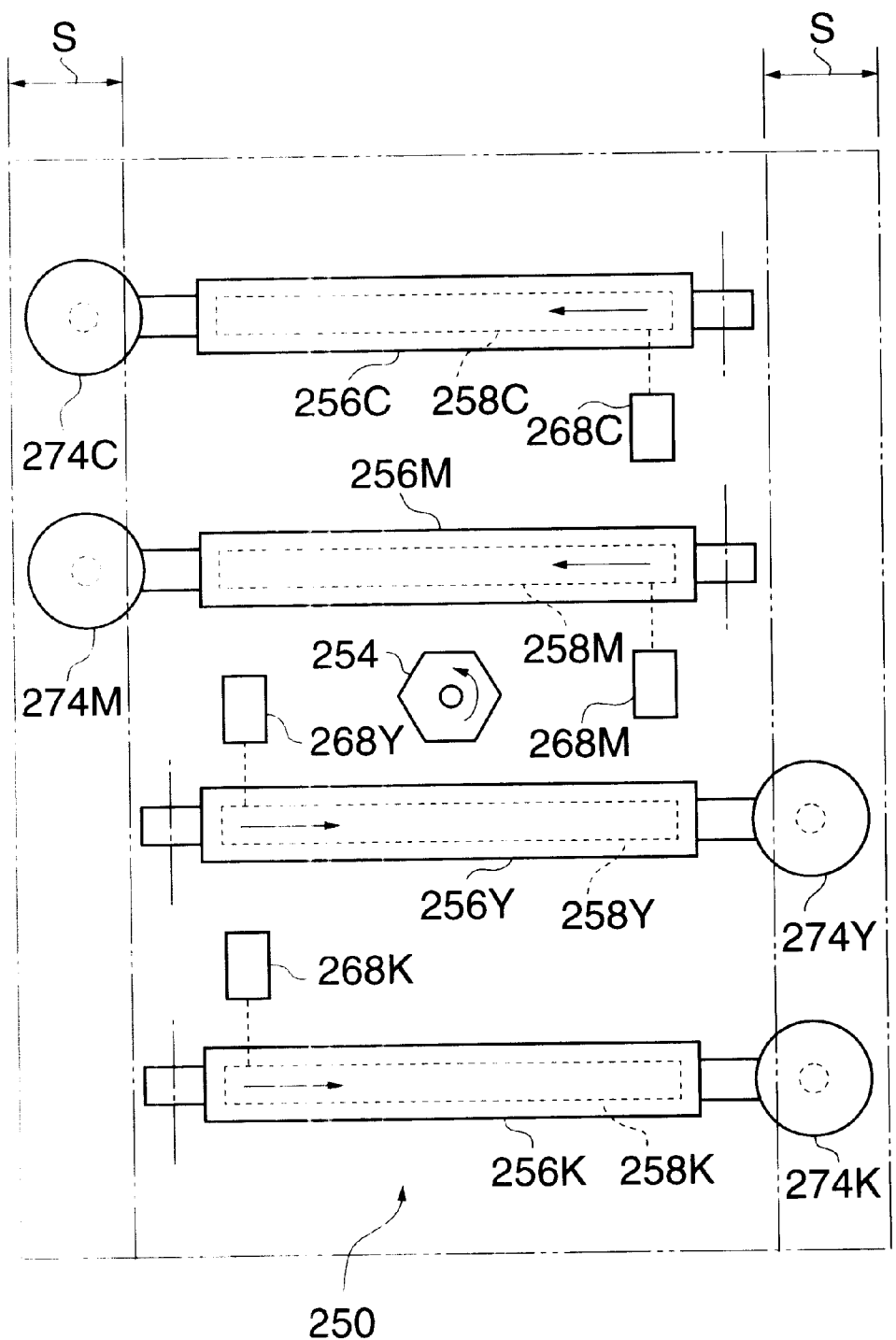
FIG. 27 is a plane view showing an outline of the exposing apparatus shown in FIG. 25.
Figure 28:
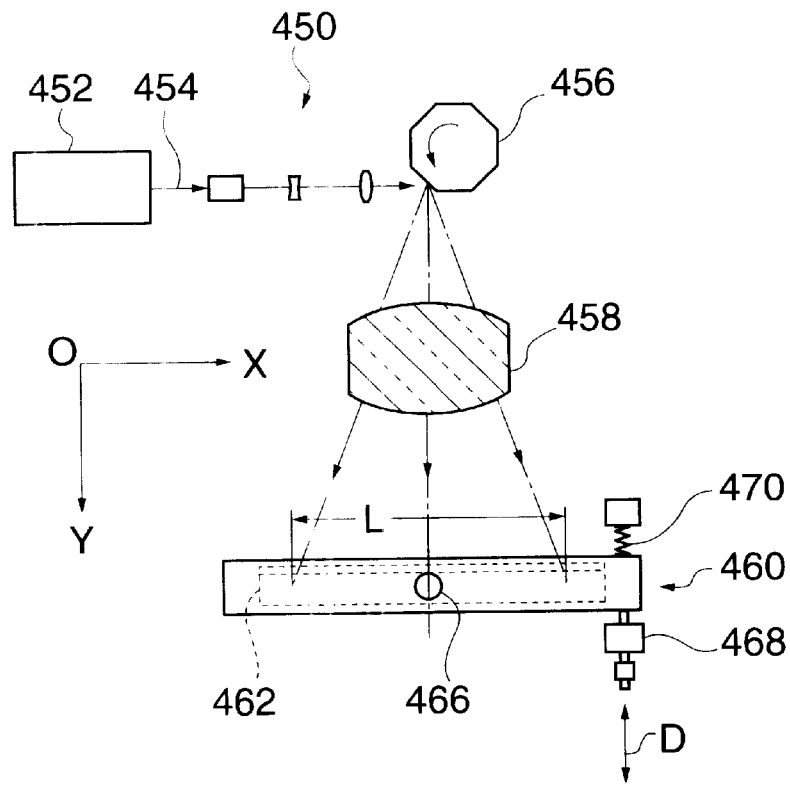
FIG. 28 is a plane view of a cylindrical mirror assembly of further another conventional exposing apparatus.
Figure 29:
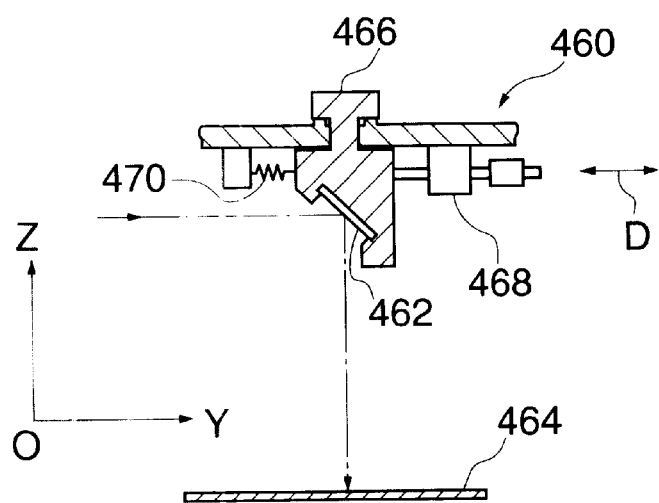
FIG. 29 is a cross-sectional view of a cylindrical mirror assembly of the exposing apparatus shown in FIG. 28.
Figure 30:
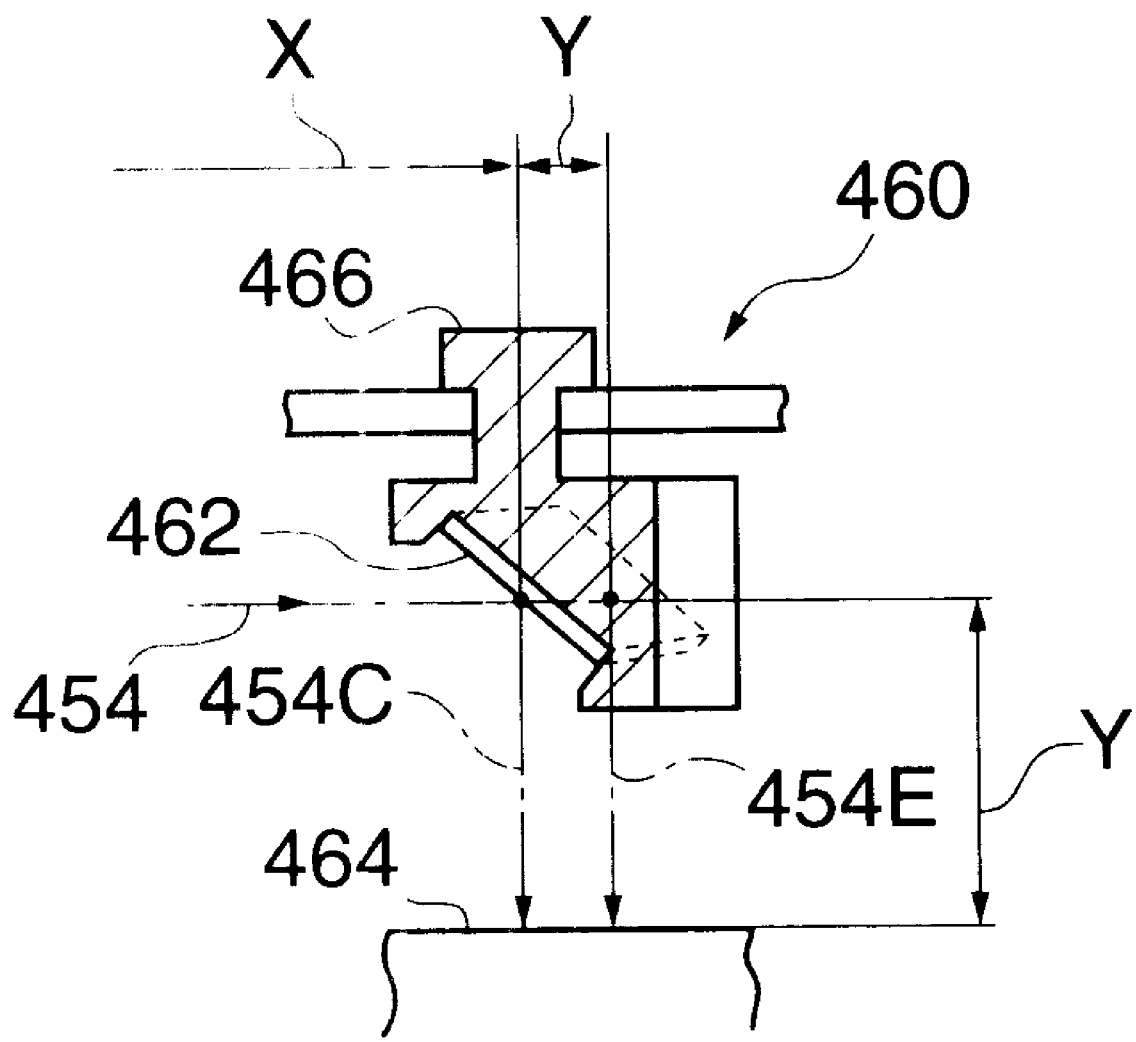
FIG. 30 is a cross-sectional view showing a light path of a light beam during adjustment of the cylindrical mirror assembly shown in FIG. 29.

Next, a description will be made of the length between the supporting part of the cylindrical mirror plate assembly 604 and the adjusting apparatus with reference to FIGS. 17, 22A and 22B. In this case, when the length from the supporting parts 400K and 400Y of the black and yellow cylindrical mirror assemblies 24'D and 24'C to the adjusting apparatuses 50K and 50Y is defined as L1 and the length from the supporting parts 400M and 400C of the magenta and cyan cylindrical mirror assemblies 24'D and 24'C to the adjusting apparatuses 50M and 50C is defined as L2, the following relation is satisfied: L1>L2. Preferably, one of the lengths should be determined at least in a range that the skew adjustment dials 76' can be operated. The adjusting apparatuses 50M and 50C less distant from the supporting parts 400 have a lower adjustment sensitivity than the adjusting apparatuses 50K and 50Y more distant from the supporting parts 400. In this embodiment, the pitch of the screw parts 78'B and 78'A of the skew adjustment dials 76' of the adjusting apparatus 50 of the magenta and cyan cylindrical mirror assemblies 24'B and 24'A is smaller than the pitch of the screw parts 78'D and 78'C of the skew adjustment dials 76' of the adjusting apparatus 50 of the black and yellow cylindrical mirror assemblies 24'D and 24'C. Accordingly, even if the lengths from the supporting part 400 to the adjusting apparatuses 50 are different, adjustment sensitivity (a movement amount of the screw parts 78' to a given rotation amount of the skew adjustment dials 76', that is, a skew adjustment amount) can be set the same by adjusting the screw parts 78'. As a result, adjustments can be performed easily. The screw part 78'D of the dial 76'K used in the black adjusting apparatus 50K and the screw part 78'C of the dial 76'Y used in the yellow adjusting apparatus 50Y have right-hand threads. On the other hand, for magenta and cyan optically in a symmetrical relation with black and yellow, the screw part 78'B of the dial 76'M used in the magenta adjusting apparatus 50M and the screw part 78'A of the dial 76'C used in the cyan adjusting apparatus 50C have left-hand threads. Hence, since the direction of each dial and the gradient direction of scanning lines are the same, adjustments can be performed easily.

The adjusting apparatuses 50 all are on the same side and bringing the cylindrical mirror assemblies 24'A, 24'B, 24'C, and 24'D near to one another does not cause the skew adjustment dials 76' to interact with one another. Namely, since the photoreceptors 38A, 38B, 38C, and 38D can be placed at short intervals, the multicolor image forming apparatus can be made more compact. Since the sub scanning position detecting sensors PSD-K, PSD-Y, PSD-M, and PSD-C to detect a beam skew in the sub scanning direction are provided in the vicinity of the supporting parts 400 (rotation fulcrums) of the cylindrical mirror assemblies 24'A, 24'B, 24'C, and 24'D, even if the cylindrical mirror assemblies 24'A, 24'B, 24'C, and 24'D are tilted by a small amount, the supporting parts 400 (rotation fulcrums) of the cylindrical mirror assemblies 24'A, 24'B, 24'C, and 24'D would move little. Accordingly, skew adjustments would not cause a movement of laser beams 14A$a$, 14B$a$, 14C$a$, and 14D$a$ which reflect in the supporting parts 400 (rotation fulcrums) of the cylindrical mirrors 24 and are incident on the sub scanning position detecting sensors PSD-K, PSD-Y, PSD-M, and PSD-C, exerting no influence on detection of skews of the laser beams 14A$a$, 14B$a$, 14C$a$, and 14D$a$ in the sub scanning direction.

As has been described above, a multicolor image forming apparatus of the present invention has, because of the above described construction, such an excellent effect that the operation of correcting skews of a plurality of images is eased. Also, since an exposing apparatus to scan a plurality of beams in a deflected manner can be miniaturized, the image forming apparatus can be made compact. Optical members can be easily corrected. Skew adjustments would cause only a slight movement of light beams which reflect on the fulcrum side of a reflecting mirror and are incident on a detecting unit, exerting no influence on detection of light beam skews in the sub scanning direction. Furthermore, the skew adjustments would exert no influence on light path length and scaling factors.

What is claimed is:

1. A multicolor image forming apparatus for obtaining a multicolor image by overlapping images of a plurality of different colors formed on a plurality of photoreceptors by a plurality of light beams, the multicolor image forming apparatus comprising: optical members provided for each of said plurality of light beams; and correction units, provided corresponding to each of said optical members, capable of moving said optical members to move irradiation positions of said light beams to be irradiated onto said photoreceptors, wherein said correction units can be adjusted by setting units that obtain a movement amount of said optical members, relative to a reference value.

2. The multicolor image forming apparatus according to claim 1, further comprising indication units that indicate the state of said correction units.

3. The multicolor image forming apparatus according to claim 2, wherein said indication units comprise a first indication unit for indicating a first state of said correction units and a second indication unit that indicates a second state of said correction units.

4. The multicolor image forming apparatus according to claim 1, wherein the operation direction of said setting units and the movement direction of irradiation positions of said light beams correspond.

5. The multicolor image forming apparatus according to claim 1, wherein said plurality of setting units are disposed in a predetermined direction.

6. The multicolor image forming apparatus according to claim 1, wherein the apparatus includes an operation part and at least one of a mechanically driven part and a heating part, and wherein the operation part for operating said setting units is isolated from at least one of the mechanically driven part and the heating part and provided in a place shielded against said light beams.

7. The multicolor image forming apparatus according to claim 1, wherein a movement amount of an irradiation position of said light beams for an operation amount of said setting units is almost identical in all setting units.

8. The multicolor image forming apparatus according to claim 1, wherein at least said setting units are separately positioned from an area defined by an exposing unit comprising at least light sources, imaging lens systems, and a deflector including a polygon mirror.

9. The multicolor image forming apparatus according to claim 1, wherein said correction units are skew correction units capable of rotating said plurality of optical members with one end thereof in a main scanning direction as a fulcrum and all of them are provided on the same side.

10. The multicolor image forming apparatus according to claim 9, wherein said exposing unit includes at least one detecting unit that detects skews of light beams in a sub scanning direction, reflected by the optical members corrected by said skew correction units, and the fulcrums of said skew correction units are provided on a detecting unit side.

11. The multicolor image forming apparatus according to claim 9, wherein said optical members are cylindrical mirrors and a movement direction of said cylindrical mirrors by said skew correction units is a reflecting interface direction.

* * * * *